United States Patent [19]

Dick

[11] Patent Number: 5,337,574
[45] Date of Patent: Aug. 16, 1994

[54] HEATING AND COOLING SYSTEM FOR A BUILDING

[75] Inventor: Brian G. Dick, Parksville, Canada

[73] Assignee: Alberni Thermodynamics Ltd., Qualicum Beach, Canada

[21] Appl. No.: 895,635

[22] Filed: Jun. 9, 1992

Related U.S. Application Data

[63] Continuation-in-part of Ser. No. 555,029, Jul. 20, 1990, abandoned.

[51] Int. Cl.$^5$ .............................................. F25D 17/00
[52] U.S. Cl. .......................................... 62/89; 62/181; 165/16; 236/13
[58] Field of Search ............... 165/36, 16; 236/13; 62/184, 181, 179, 89

[56] References Cited

U.S. PATENT DOCUMENTS

| | | | |
|---|---|---|---|
| 2,209,787 | 7/1940 | Miller | 236/1 R |
| 2,263,742 | 11/1941 | Shivers | 236/13 |
| 2,474,304 | 6/1949 | Clancy | 62/6 |
| 2,952,991 | 9/1960 | St. Pierre | 62/184 |
| 3,004,402 | 10/1961 | Dart et al. | 62/183 |
| 3,949,807 | 4/1976 | Tyler | 165/16 |
| 4,286,438 | 9/1981 | Clarke | 62/216 |
| 4,381,074 | 4/1983 | Iijima et al. | 236/13 |
| 4,628,701 | 12/1986 | Phillips et al. | 62/184 |
| 4,899,549 | 2/1990 | Berge et al. | 62/217 |

FOREIGN PATENT DOCUMENTS

| | | | |
|---|---|---|---|
| 3329574 | 3/1985 | Fed. Rep. of Germany | 62/228.4 |
| 2323964 | 4/1977 | France | |
| 2391427 | 12/1978 | France | |
| 2419472 | 10/1979 | France | |
| 55-152336 | 11/1980 | Japan | 62/228.4 |
| 55-152337 | 11/1980 | Japan | 62/228.4 |
| 59-56648 | 4/1984 | Japan | 62/228.4 |

Primary Examiner—William E. Wayner
Attorney, Agent, or Firm—Bull, Housser & Tupper

[57] ABSTRACT

A reversible vapour compression refrigeration plant serves as an air conditioner for cooling or as a heat pump for heating. A main stream of inlet air is divided into separate main and bypass streams of air and proportion of flow between the two streams is varied in an inverse ratio so that as flow through the bypass duct increases, flow through the main duct decreases and vice versa. When the plant is used for heating, the main stream is heated by a supply heat exchanger acting as a condenser and when the plant is used as an air conditioner, the supply heat exchanger acts as an evaporator. Also, as an additional alternative, as a desired air space temperature is approached, preferably heat rejected by a condenser in the heating mode, or heat gathered by the evaporator in the cooling mode, is gradually reduced by reducing refrigerant flow therethrough by modulating compressor suction. Full fresh air or full re-circulating air modes, or a combination of mixed and re-circulating air can be used. Also, energy is saved in both the heating and cooling modes by locating an exhaust heat exchanger within exhaust flow discharged from the space to be heated or cooled.

36 Claims, 6 Drawing Sheets

HEATING AND COOLING SYSTEM FOR A BUILDING

CROSS REFERENCES TO RELATED APPLICATIONS

This is a continuation-in-part application of my co-pending application Ser. No. 07/555,029 filed Jul. 20, 1990, now abandoned.

BACKGROUND OF THE INVENTION

The invention relates to a heating and cooling system for air, for example for maintaining a desired air temperature in a building using fresh air or re-circulating room air or a mixture thereof, by using an air-conditioning system which can be "reversed" to function as a heat pump.

It is known that a conventional refrigeration system using a vapour compression refrigerator can be reversed to function as a heat pump. A conventional refrigeration plant cools a space by extracting heat therefrom by evaporation of a refrigerant or working fluid, and rejects the heat outside by condensation. On the other hand, a heat pump utilizes the heat rejected by condensation of the refrigerant to heat a space, and extracts heat from outside by evaporation of the refrigerant.

A refrigeration or heat pump plant is said to be in thermal balance when rates of evaporation and condensation are equal. This requires matching the capacity of the evaporator and condenser as closely as possible, and this matching can present problems. Matching or balancing the capacity of a vapour compression system is particularly difficult if that system is to be reversed to be used as a heat pump as well as an air conditioner. Air conditioners are generally matched to 90 per cent to 95 per cent of the maximum cooling load so as not to run continuously for the majority of the cooling season because they are over-sized when the weather is moderate. An over-sized air conditioner tends to cycle off, that is to switch off, having achieved the space temperature requirements before sufficient de-humidification is accomplished. This results in cool but muggy air within the air conditioned space because the evaporator generally operates below the dew point temperature of the air being treated.

In air-conditioning systems, most of the matching problems arise from the wide variations that can be experienced by the condenser when it is located in ambient air outside the building. Many methods of bringing into balance the rates of evaporation and condensation are available for air-conditioners as will be described. On the other hand, while heat pumps are well known for their relatively high cycle efficiency, problems have arisen in matching the heat rejection capacity of the condenser with the heat absorbing capacity of the evaporator. If the range of outside air temperature passing through the condenser is relatively narrow, matching of the evaporator and condenser capacities is relatively easy and the heat pump can function efficiently. However, if there is a relatively wide range of temperature differences across the condenser of the heat pump, matching of the condenser and evaporator capacities while maintaining high efficiency and high discharge temperature becomes very difficult.

Matching of the capacities of the evaporator and condenser in a refrigerating unit has been accomplished by many different approaches. For a proper balance, refrigerant pressure within the system must be controlled accurately, and this can be done by controlling the rates of condensation and evaporation, using many different methods. One means of approaching balance for common, commercially produced air-conditioners when used in a temperate climate where less condenser capacity is required is to partially flood the condenser with liquid refrigerant, thus effectively reducing condenser area to compensate for cooler ambient air. This requires using larger amounts of refrigerant than would otherwise be required. On the other hand, when attempting to match capacities of the condenser and evaporator in a heat pump system when temperature of air entering the condenser varies, as in fresh air heating, many other difficulties can arise. Typical problems encountered include attempting to maintain design condensing pressure for all outside temperatures with a constant volume make-up air passing through the condenser coil. If the heat pump system has only a single compressor, unloaders using a bypass regulator are required to short circuit refrigerant, thus reducing heat capacity demands but this approach reduces efficiency when attempting to maintain adequate pressure in the condenser.

One factor in compressor matching relates to the density of the vapour to be compressed. Any increase in specific density of the vapour to be compressed requires a corresponding increase in compressor power which is not easily attainable with most single speed compressors. While some compressors are two-speed types, such types require separate windings for each speed, which increases in control complexity, and thus two speed compressors are not common. Running a compressor at low speed to reduce compressor output often increases refrigerant density, which requires a correspondingly higher power input per stroke. Dynamic balancing becomes more difficult at low speed, and oil entrainment for compressor lubrication can suffer at low speed. While in general improved lubrication takes place with high speed compressor operation, adequate return of the oil to the compressor is necessary. Varying operating speed of a compressor can result in poor lubrication and correspondingly aggravate wear of the compressor.

When a heat pump or air conditioner cannot reject all the heat gathered, compressor discharge pressure (i.e. condenser inlet pressure) increases as the vapour occupies a higher specific volume in the condenser than as a condensed liquid. If pressure limiting controls are present, the compressor will shut off until the discharge pressure drops below some nominal reset value. Automatic reset can cause short-cycling of the compressor which pumps oil from the compressor and could result in premature failure due to insufficient lubrication. Alternatively, manual reset of the compressor can be used but this is inconvenient, but it can overcome the short-cycling problems described above.

Constant volume air-conditioners using make-up air have to accommodate wide variations of ambient temperature and still provide a desired cooled space temperature. Clearly, as the ambient temperature rises, more heat must be removed from the air entering the evaporator than with lower ambient temperatures. In order to accommodate these outside air temperature variations in an air conditioner, air flow control means are provided to regulate flow of outside air through the condenser coil of the air-conditioner. The higher the ambient temperature, the more air must pass through the condenser coil and vice versa. Usually air flow control means, termed face dampers, are fitted to control air flow through the main condenser coil. For relatively cool ambient temperatures, where not much heat is removed from incoming air, the face dampers will be closed so that little of the outside air will pass through the condenser. As ambient or outside temperature rises, the face dampers will be opened, to ensure that more outside air will be passed through the condenser.

Many prior art heat pumps have provisions of introducing a limited amount of fresh air into the building stream, and separate exhaust fans expel a similar quantity of exhaust air. As the public's awareness of insufficient fresh air supply to buildings increases, new demands are placed upon heat pumps, air conditioners and other equipment to use greater volumes of fresh air. It is well known that exhausted air contains heat, and while attempts have been made to collect heat from the exhausted air using conventional heat exchangers, such devices are costly, power consuming and relatively inefficient for heat transfer to incoming air.

In all air-conditioning systems known to the inventor, the condenser used to reject heat is located in ambient air, and, to improve heat transfer, the condenser can be cooled by many different methods. The efficiency of heat transfer from the hot refrigerant in the condenser to ambient air is dependent, among other things, on temperature difference between the hot refrigerant and the ambient air. Various means, such as sprayed water cooling for direct evaporation on the coil have been used to assist in condensing the refrigerant.

SUMMARY OF THE INVENTION

The invention reduces the difficulties and disadvantages of the prior art by providing a relatively low capital cost heating and cooling system which also operates efficiently in both heating and cooling modes. The invention also provides a relatively simple means of reducing differences in matching heat transfer capacity between the evaporator and condenser of a heat pump, by controlling essentially constant volume fresh air flow therethrough automatically to maintain high efficiency for a relatively wide range of outside temperature. Also, by varying compressor suction in response to set point variation, evaporator temperature is controlled, which in turn controls heat rejection at a condenser.

Also, the efficiency of heat transfer relative to a coil is improved by locating the coil actually in exhaust air flow from a building being cooled or heated, as opposed to locating the coil in ambient air which requires an auxiliary fan or other means to effect heat transfer. In air-conditioning, because air exhausted from the building being cooled is usually cooler than ambient, a cooler condensing medium for the condenser is attained which, by itself, improves heat rejection in the condenser. On the other hand, in the heat pump mode, because air exhausted from the building being heated is usually warmer than winter outside air, locating the evaporator in exhaust air flow from the building being heated will recover more heat in the evaporator than the prior art location of the evaporator in outside air. This additional heat extracted from the exhaust air can then be "intensified" by the compressor before being rejected into the fresh air stream by the condenser.

A method according to the invention is for treating air and comprises the steps:

generating main and bypass streams of air, and initially maintaining the two streams of air separate from each other, directing the main stream of air through a supply heat exchanger of a vapour compression machine to change temperature of the main stream of air, generating a first control signal representing a difference between an actual first reference temperature and a pre-determined first reference temperature, and then controlling ratio of flow of the main and bypass streams of air in response to the first control signal so that if the first control signal reflects an actual first reference temperature below the pre-determined first reference temperature, the main flow is decreased if heating the main flow, or increased if cooling the main flow, and if the first signal reflects an actual first reference temperature above the pre-determined first reference temperature, the main flow is increased if heating the main flow, or decreased if cooling the main flow, and then mixing the main stream of air after passing through the heat exchanger with the bypass stream of air, if any air were passed through the bypass flow control means, prior to delivering the mixture of air streams.

Preferably, the main stream of air is controlled also in response to the first control signal in an inverse flow ratio to the bypass stream of air so that as flow through the main duct increases, flow through the bypass duct decreases and vice versa.

The method also includes generating a second control signal reflecting difference between an actual second reference temperature and a pre-determined second reference temperature. The method further comprises gradually varying flow of refrigerant to a compressor of the vapour compression machine in proportion to difference between the actual second reference temperature and the pre-determined second reference temperature. This control can be attained by controlling heat gathered in an evaporator of the vapour compression machine.

An apparatus according to the invention is for treating air in a space and comprises a supply chamber, propulsion means, a supply heat exchanger, a first temperature sensor means, a air flow control means, an actuator means and mixing means. The chamber has main and bypass ducts for receiving and initially maintaining separate main and bypass streams of air. The propulsion means is for generating air flow through at least one of the ducts. The supply heat exchanger is of a vapour compression machine and is provided in the main duct to change temperature of the main stream of air passing through the main duct. The first temperature sensor means generates a first control signal representing difference between an actual first reference temperature and a predetermined first reference temperature. The air flow control means controls flow of air through the main and bypass ducts. The actuator means is responsive to the first control signal and is operatively coupled to the bypass flow control means to actuate the control means so as to vary ratio of restriction to air flow through the main and bypass ducts, the actuator means being responsive to the first control signal. The mixing means is for mixing together the streams of air discharged from the main and bypass ducts prior to discharging the mixed streams of air into the space.

Preferably, the air flow control means comprises a main flow control means and bypass flow control means cooperating with the main duct and bypass duct respectively to control flow therethrough and the apparatus further comprises coupling means coupled to the main flow control means and the bypass flow control means so that the main flow control means is actuated in an inverse relationship to the bypass flow control means.

The apparatus further comprises a second temperature sensor means and a heat exchange control means. The second sensor means generates a second control signal representing difference between an actual second reference temperature and a pre-determined second reference temperature. The heat exchange control means cooperates with a compressor of the vapour compression machine so that heat exchange is in proportion to difference between the actual second reference temperature and the pre-determined second reference temperature. In this way, as the said difference becomes gradually smaller, heat transferred between air passing through the supply heat exchanger is gradually reduced, and vice versa. Preferably, the heat exchange control means is a fluid flow modulating valve cooperating with a conduit communicating with an intake of the compressor of the vapour compression.

Another method of treating air according to the invention comprises the steps of:
(a) directing a stream of air through a supply heat exchanger of a vapour compression machine to change temperature of the stream of air,
(b) generating a second control signal representing the difference between an actual second reference temperature and a pre-determined second reference temperature, and
(c) controlling heat transfer at the supply heat exchanger in proportion to difference between the actual second reference temperature and the pre-determined second reference temperature. The controlling of the heat exchange at the supply heat exchanger is preferably by controlling heat gathered in an evaporator of the machine by controlling a pressure difference between an intake of a compressor and the evaporator.

Another apparatus for treating air comprises a supply chamber, a supply heat exchanger, a temperature sensor and a heat exchange control means. The supply chamber has a duct to receive air to be treated and a propulsion means for generating flow of a stream of air through the duct. The supply heat exchanger is of a vapour compression machine and is provided in the duct to change temperature of the stream of air passing along the duct. The temperature sensor generates a second control signal representing difference between an actual second reference temperature and a pre-determined second reference temperature. The heat exchange control means controls heat exchanged at the supply heat exchanger, so that the said heat exchange is in proportion to difference between the actual second reference temperature and the pre-determined second reference temperature. The heat exchange control means cooperates with an intake of a compressor of the vapour compression machine so that as said difference in temperatures become smaller, heat exchanged to the air passing through the heat exchanger is gradually reduced, and vice versa.

Yet another method of heating an air space according to the invention comprises the steps of:
drawing air through a condenser of a heat pump so that condensation of refrigerant therein heats the air prior to discharging the air into the air space,
drawing air from the space to be heated through an evaporator of the heat pump to heat the refrigerant therein,
transferring the heated refrigerant from the evaporator to the condenser.

Yet another apparatus according to the invention is for heating an air space and comprises an inlet duct and an outlet duct communicating with the space, and means to move the air through the inlet duct into the space, and to discharge air from the space through the outlet duct. The apparatus also includes a refrigerant condenser in the inlet duct, a refrigerant evaporator in the outlet duct, and refrigerant conduit means and a compressor communicating the evaporator and the condenser and transmitting refrigerant therebetween to function as a heat pump.

Yet a further method according to the invention is for cooling an air space and comprises the steps of:
drawing air through an evaporator of a refrigeration plant so that evaporation of the refrigerant thereof cools the air prior to discharging the air into the space,
drawing air from the space to be cooled through a condenser of the refrigeration plant to cool the refrigerant thereof,
transferring the cooled refrigerant from the condenser to the evaporator.

Yet a further apparatus, according to the invention, is for cooling an air space and comprises an inlet duct and an outlet duct communicating with the space, and means to move the air through the inlet duct into the space and to discharge air from the space through the outlet duct. The apparatus further includes a refrigerant evaporator in the inlet duct, a refrigerant condenser in the outlet duct and refrigerant conduit means and a compressor communicating the evaporator and condenser and transmitting refrigerant therebetween to function as a refrigeration plant.

A detailed disclosure following, related to drawings, describes several apparatuses and methods according to the invention which are capable of expression in structure and methods other than those particularly described and illustrated.

DETAILED DISCLOSURE

FIG. 1

Figure 1:
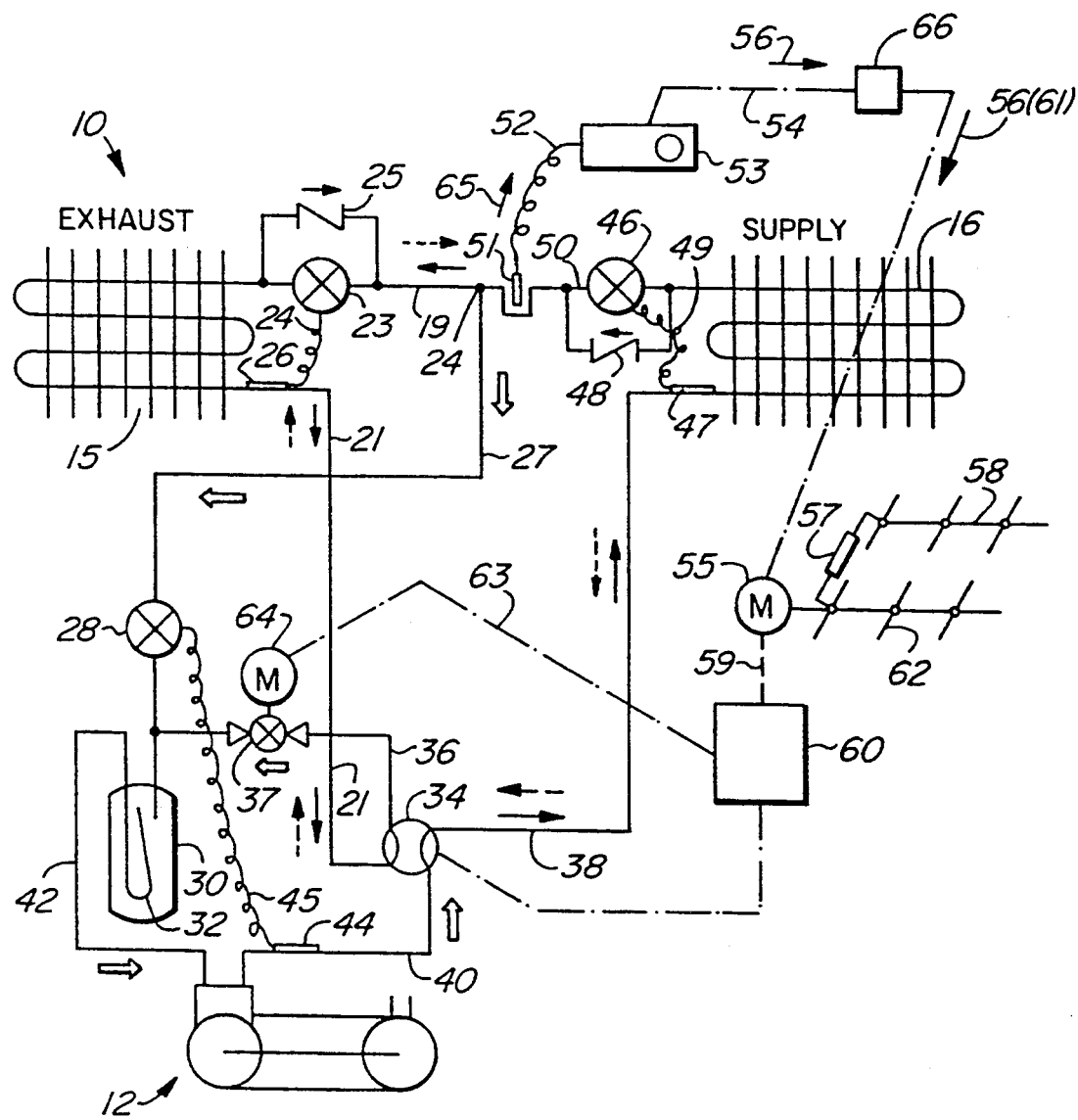
FIG. 1 is a simplified fluid schematic showing a refrigerant circuit of a heating and cooling system according to the invention, also showing some peripheral control circuits, temperature sensors and schematic connections.

A heating and cooling apparatus 10 according to the invention resembles an air-conditioning system for cooling air, and can also be reversed to function as a heat pump to heat the air. The terms "vapour compression machine", "heat pump", "refrigeration plant" or "air-conditioner" as used herein are used synonymously to describe a vapour compression machine which can be operated in either mode, to deliver heat to or to extract heat from a main air space e.g. a room within a building. The apparatus 10 has a motor/compressor assembly 12 complete with an internal line-break overload device, crankcase heater and other features which are not shown but are common to refrigeration plant compressors. The apparatus includes generally similar heat exchange coils 15 and 16, the coil 15 being for exhaust air which is returned to outside, and the coil 16 being for supply air drawn into the building from outside. Each coil is relatively conventional for heat pumps, and is fabricated from copper or aluminum tubes with fins, with a distributor and a header and circuited so that one-half of the coil is counterflow regardless of direction of refrigerant flow. Each heat exchange coil is fitted within a refrigerant circuit with components as follows, most of which are also found in conventional refrigeration plants or air-conditioning systems. The coils 15 and 16 can also be referred to as exhaust and supply heat exchangers respectively.

Direction of flow in the refrigerant circuit of FIG. 1 is designated by three different types of arrows. A large or multi-bodied arrow shows direction of flow which is independent of the mode of operation, in other words the direction of refrigerant flow in conduits designated by a multi-bodied arrow does not change as the mode of operation changes. A second type of arrow is a single-bodied full outline arrow which shows direction of refrigerant flow in a heating mode only. A third type of arrow is shown in broken outline, shows a reversed direction of refrigerant flow which occurs only in a cooling mode. Flow in the heating mode is described first, and thus refers to the arrows in full outline, namely the multi-bodied arrows and the single-bodied full outline arrows. Most of the refrigerant flow in the cooling mode follows conventional air-conditioning practice, and is described briefly later.

In the heating mode, the exhaust coil 15 acts as an evaporator, and thus receives liquid at an inlet thereof, and exhausts vapour at an outlet thereof. Conversely, the supply coil 16 acts as a condenser and receives vapour at an inlet thereof and exhausts liquid at an outlet. A first liquid line 19 feeds liquid into the exhaust air coil 15 and a vapour line 21 leaves the coil. An exhaust coil thermostatic expansion valve 23 is fitted in the line 19 and an exhaust coil check valve 25 is coupled in parallel with the valve 23. The valve 23 is connected by a capillary tube 24 to a temperature sensing bulb 26 on the line 21 at the outlet of the coil 15, the valve 23 thus being responsive to the coil outlet temperature. A second liquid line 27 extends from a junction 24 with the first liquid line 19 and feeds liquid to a de-superheating thermostatic expansion valve 28, and then feeds liquid into a pressure vessel 30 with an internal J-tube 32 on an outlet connection.

The vapour line 21 feeds vapour into a hermetic, pilot slide-type, two-position, four-way reversing valve 34 which is actuated by an integral solenoid controlled by signal to be described. The valve 34 communicates with three other lines, namely a refrigerant suction line 36, a refrigerant vapour line 38 and a discharge line 40 extending from the outlet of the compressor. In the heating mode as shown, the valve 34 is positioned so that the vapour line 21 communicates with the refrigerant suction line 36, and the discharge line 40 communicates with the vapour line 38. The line 36 communicates with a modulating suction cut-off valve 37 which is electronically controlled by means to be described, and, when required, can throttle refrigerant as it passes along the line 36 towards the compressor 12. One example of the valve 37 is manufactured by the Sporlan Valve Company of St. Louis, Mo., U.S.A., and is called a CDA electronic temperature control valve and is a solenoid-actuated, flow modulating valve. This is an important valve for the invention and, when required, can throttle supply of the vapour to the compressor to provide significant advantages in heating and cooling, as will be described, from full flow to a small fraction of normal flow.

The J-tube 32 in the pressure vessel 30 communicates with a suction line 42 which feeds vapour into the compressor 12 and communicates with the discharge line 40. A temperature sensing bulb 44 on the line 40 controls the thermostatic expansion valve 28 through a capillary tube 45. The valve 28 limits compressor discharge temperature by metering liquid refrigerant directly into the final compressor suction line 42.

The refrigerant vapour line 38 feeds vapour into the coil 16 for heating the supply air by condensation. The coil 16 communicates with a thermostatic expansion valve 46 mounted in parallel with a supply coil check valve 48. A temperature sensing bulb 47 in the line 38 controls the valve 46 through a capillary tube 49. A temperature sensor 51 is fitted in an outlet line 50 extending from the coil 16 to the junction 24 with the liquid line 19. The sensor 51 is connected by a tube or lead 52 to a remote sensing proportioning controller 53 which positions a modulating actuator 55 through a lead 54.

The sensor 51 is located on a side of the supply coil 16 which serves as an outlet side when the system operates in the heat pump mode, and this sensor generates an actual first reference temperature signal 65. The signal 65 reflects actual refrigerant condensing temperature and is fed into the controller 53 which is pre-programmed with specific parameters. Hereinafter and in the claims, the actual temperature of the condensing refrigerant circulating within the circuit is referred to as the "actual first reference temperature", and the term "pre-determined first reference temperature" refers to one of the known parameters programmed into the controller 53. The controller, in turn, generates a first control signal 56 which is outputted through a damper relay 66 as a damper relay output signal 61 to the actuator 55. The relay 66 is for inverting the signal 56 in the cooling mode as will be described. The control signal 56 represents a difference between the actual first reference temperature 65 and the predetermined first reference temperature as pre-programmed in the controller 53 and in the claims is referred to as a first temperature difference. This is important to the invention as will be described, particularly with reference to FIG. 12. The proportioning controller 53 is an ambient compensated device, such as a Honeywell T 991A 1061 or T 775 series, having an output range from 0 to 135 ohms.

The modulating actuator 55 has a rotating arm output complete with an adjustable stroke and adjustable dead band response. The actuator 55 is directly mechanically coupled to face dampers 62 to control flow of air therethrough by positioning the dampers in any position between and including closed and open positions. The face dampers 62 are selectively coupled through a telescopic coupling means 57 to bypass dampers 58 in the fresh air mode, but can be decoupled as will be described. The dampers 58 are generally similar to the face dampers 62 but, when decoupled from the coupling means 57, are normally gravity-biased to a closed position and are an important feature of the invention. Both dampers 58 and 62 are parallel blade type and serve as variable air flow control means and determine flow through the supply coil as will be described. The actuator 55 can be a Honeywell M 984 which is electrically coupled by a lead 59 to a temperature control system 60 which is described with reference to FIG. 12. The system 60 is connected by a lead 63 to a motor 64 controlling the modulating suction cut-off valve 37 as will be described. The motor 64 can position the valve 37 in any position between fully open and fully closed. The face and bypass dampers 62 and 58 and associated couplings will be described in more detail with reference to FIGS. 2, 3 and 7-11.

As previously stated, the directions of refrigerant flows as described above relate to operation of the circuit in the heating mode. When the system is reversed to function as an air-conditioner or refrigeration mode, the reversing valve 34 is actuated so as to couple the line 36 to the line 38, and the line 21 to the line 40. Clearly, refrigerant vapour passes through the compressor 12, and then passes through the line 21 into the exhaust coil 15, now acting as a condenser, where it leaves as liquid to pass into the junction 24 with the lines 19 and 27. From here liquid returns down the line 27 to the valve 28 as before. Liquid also flows from the junction 24 past the sensor 51 to the expansion valve 46 which meters liquid refrigerant into the coil 16 where it evaporates and gathers heat. The sensor 51 is thus at the outlet of the exhaust heat exchanger 16, now acting as the condenser, and thus senses refrigerant condensing temperature, which is now the actual first reference temperature. The sensor 51 always senses condensing temperature as it is always connected to the outlet side of the condenser, whichever heat exchanger it may be. Vapour passes along the line 38 from the supply coil 16 acting as an evaporator, where it returns through suction lines 36 and 42 to the compressor 12. With the exception of the function of the valve 37, which is to be described, the above description of flow of the refrigerant through the circuit in the air-conditioning mode is identical to the prior art.

Figure 2:
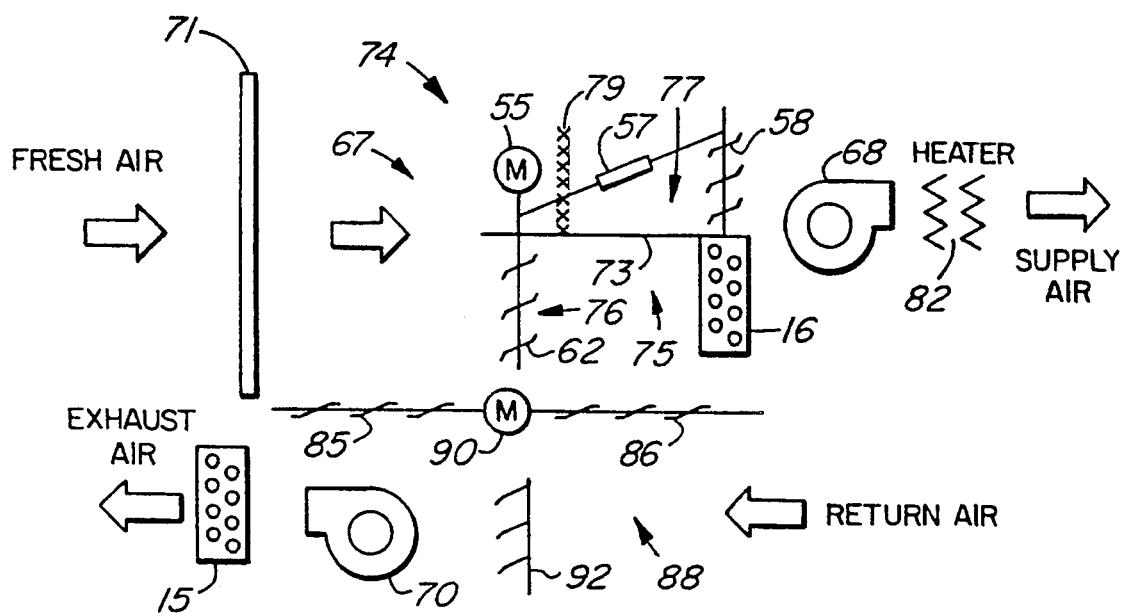
FIG. 2 is a simplified diagram of an air flow circuit of the apparatus according to the invention, the apparatus being shown in a one hundred percent fresh-air mode.
Figure 3:
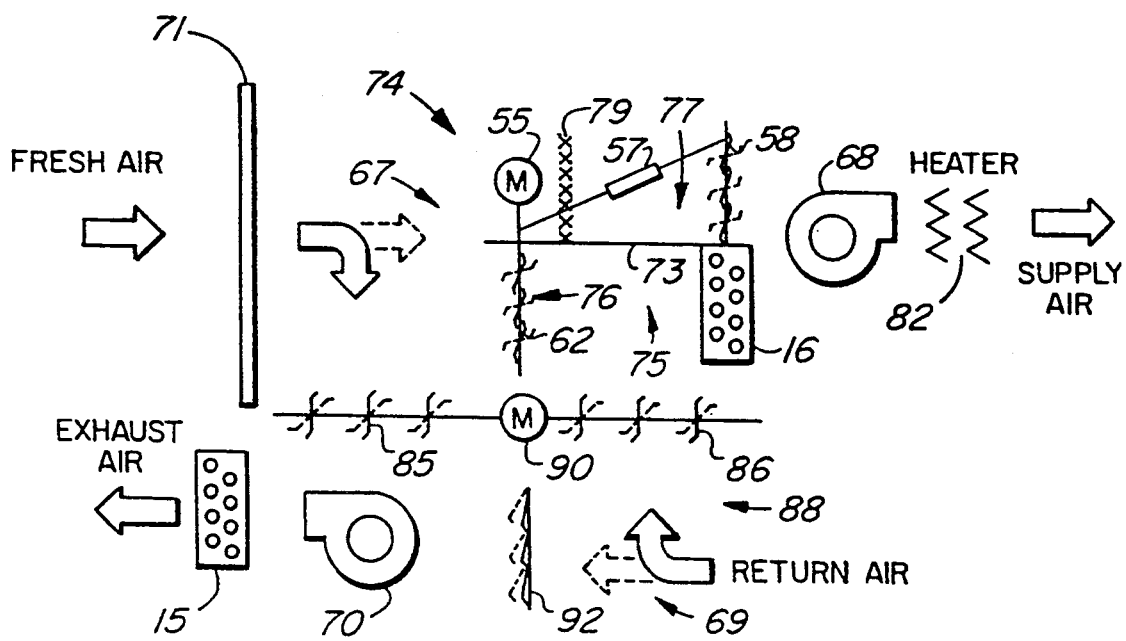
FIG. 3 is a simplified diagram of the air flow circuit of the apparatus according to the invention, the apparatus being shown in full outline in a one hundred percent re-circulating mode, and in broken outline in a mixed fresh/re-circulating air mode.

FIGS. 2 and 3

As previously stated, FIGS. 2 and 3 show air flow through the system and damper positions, with other components being omitted. FIG. 2 shows one hundred percent fresh air mode. FIG. 3 shows one hundred percent re-circulation air mode in full outline, with an optional mixed fresh/re-circulating air mode configuration in broken outline. In all fresh air, re-circulation and mixed air modes, air is moved through a supply chamber 67 of the apparatus 10 under the influence of a supply air fan 68, and through an exhaust chamber 69 by an exhaust air fan 70. The fan 68 is located closely adjacent the supply air coil 16, and draws air therethrough, and the fan 70 is located closely adjacent the exhaust air coil 15 and blows air therethrough.

(a) Full Fresh Air Mode-Heating

In FIG. 2, in the full or one hundred percent fresh air heating mode, the dampers 58 are coupled to the dampers 62 by the coupling means 57 and fresh air is drawn from the outside through a pre-filter 71 mounted upstream of the face dampers 62. A horizontal partition 73 divides an inlet air flow path 74 through the chamber 67 into initially separate main and bypass ducts 76 and 77 respectively. The main duct includes the face damper 62, and an inlet space 75 disposed between the face dampers and the supply air coil 16 which is serving as a condenser. The bypass duct 77 extends from the pre-filter, through a bypass restrictor screen 79 and then through the bypass dampers 58. The screen 79 is selected to provide a resistance to air flow approximately equal to the resistance to air flow of the coil 16. Thus, when the dampers 58 and 62 are both half open, volume flow through the ducts 76 and 77 is approximately equal.

As previously stated, the telescopic coupling 57 couples the bypass dampers 58 to the face dampers 62 and ultimately to the actuator 55. As will be described with reference to FIGS. 7-11, the telescopic coupling 57 serves as a means to engage and disengage the coupling between the face dampers 62 and the bypass dampers 58. When the telescopic coupling is engaged as in full fresh air and mixed air modes, the actuator 55 is directly mechanically coupled to both the face and bypass dampers 62 and 58 so that the dampers operate in equal and opposite directions to each other. That is, when the face damper 62 is fully open, the bypass damper 58 is fully closed and vice versa. This is attained by suitable adjustment of linkage lengths and lever angles as will be described with reference to FIGS. 9-11. Thus, it can be seen that there is an inverse proportionally between the bypass and face dampers at extremes of movement, and there is a similar inverse proportionality for intermediate positions of the dampers. Because the dampers 58 and 62 are inversely proportionally coupled, as the face dampers 62 approach the closed position, the bypass dampers 58 open and this decreases flow through the coil 16, and increases flow to bypass the coil. This action occurs in a situation where fresh air temperature decreases, thus requiring a smaller volume flow of colder supply air through the condenser 16. Clearly, the colder the outside air, the less volume flow of air is required to maintain optimum balance between the condenser and evaporator. This coupling permits the refrigeration system to be balanced with precision through a range of temperature far wider than in prior art constant volume fresh air systems.

It can be seen that the bypass dampers 58 serve as bypass flow control means cooperating with the bypass duct 77 to control flow of the bypass stream of air therethrough. Similarly, it can be seen that the face dampers 62 serve as main flow control means cooperating with the main duct 76 to control flow of air therethrough. The dampers 62 and 58 serve as air flow control means for controlling ratio of flow of streams of air through the main and bypass ducts. The fan 68 is located so that an intake thereof receives air from both the coil 16 and the bypass dampers 58, if open. An auxiliary heater 82 receives air from the fan 68 and can provide additional heat to the space to be heated with supply air, as needed. Auxiliary heat is needed when there is insufficient capacity in the heat pump alone to meet the fresh air heating demand as is well known in other prior art heat pump systems.

First and second re-circulating dampers 85 and 86 are disposed between the inlet air flow path 74 and a return air flow path 88. The dampers 85 and 86 are also parallel blade type and can be positioned in any position between and including open and closed. The dampers 85 and 86 in general assume identical positions and are controlled concurrently through a variable position damper operating motor 90. In FIG. 2, in the full fresh air mode, the motor 90 has been actuated by a positioner to be described so that the re-circulation dampers 85 and 86 are fully closed. Barometric dampers 92 are fitted upstream of the fan 70 and are responsive to pressure differences thereacross so as to control air flow into the fan 70, and thus flow through the coil 15 and out to ambient air as exhaust. Heated air from the space passes through the dampers 92 due to suction from the fan 70, and heat from this air is partially recovered in the exhaust heat exchanger 15, acting as an evaporator. In the prior art, recovery of heat from exhausting inside air is usually costly and inefficient as a separate air-to-air heat exchanger is required. This increases installation costs and fan power requirements. If a conventional heat pump is used to gather heat from outside air or other medium, the outside air is usually at a temperature less than the inside air. It follows that prior art heat recovery is less efficient than in the present invention, which uses the heated inside air as the heating medium for the evaporator to gather some of this heat which would otherwise be rejected. Thus, locating the evaporator in the heated exhaust air stream requires less energy than in the prior art.

In summary, there are five sets of dampers, namely the bypass and face dampers 58 and 62 which can be operated inversely to each other to divide inlet flow in the fresh air mode, or the damper 58 can be separated as will be described; the re-circulating dampers 85 and 86 which operate equally together; and the independently operated barometric dampers 92. As will be described, the re-circulating dampers 85 and 86 serve as re-circulating flow control means disposed between the inlet chamber and the main space being heated. The re-circulating flow control means can be set at either open, closed or at intermediate positions as determined by the mode of operation of the equipment and the amount of fresh air required for the building. The barometric dampers 92 are also conventional parallel blade type dampers which are gravity biased closed and which automatically open to pass air outwardly from the building when the pressure difference across the damper is greatest on the side of the dampers exposed to room air.

(b) Full Re-circulating Air Mode-Heating

In FIG. 3, referring to the full or one hundred percent re-circulating heating mode shown in full outline, the coupling means 57 has been actuated to decouple the face and bypass dampers 62 and 58 respectively, to permit both dampers to close, as will be described. The motor 90 has been actuated to fully open the first and second re-circulating dampers 85 and 86 respectively. The exhaust chamber 69 is now exposed to suction from the supply chamber 67 and thus, because the pressure differences across the dampers 92 is essentially zero, the dampers 92 will automatically close. In the full re-circulating mode, return air from the heated space is now drawn through the second re-circulating dampers 86 into the inlet space 75, and back through the coil 16. The fan 68 draws the re-circulated air through the coil 16 to be heated and is then fed back into the space to be heated. The closed dampers 62 and 92 prevent mixing of the two streams of air from the supply chamber 67 and the exhaust chamber 69. On the opposite side of the dampers 62 and 92, fresh air is drawn through the open re-circulating dampers 85, through the fan 70 and is then forced through the coil 15 back to atmosphere, the fresh air simultaneously being cooled by the coil 15 as the refrigerant boils and extracts heats from outside air as in a conventional heat pump.

(c) Mixed Fresh/Re-circulating Air Mode-Heating

In FIG. 3, referring to the mixed fresh and re-circulating air mode, the motor 90 has been actuated by a control to be described to position the first and second re-circulating dampers 85 and 86 respectively in a partially open position as shown in broken outline. The actual angle of the dampers 85 and 86 is based on one or more parameters as determined by particular building requirements, e.g. the fresh air requirement of the building, that is, a ratio of fresh to re-circulating air, carbon dioxide levels etc. Usually, depending on outside temperature and operating requirements, for efficient operation of the present invention ratio of fresh air to recirculated air is between about ten and thirty per cent. To maintain a particular ratio of fresh air to re-circulating air, selective adjustment of the angles of the dampers 85 and 86 would be required. Because of the fresh air requirement, the coupling means 57 is actuated to couple the dampers 58 and 62 for inversely proportional movement. The face dampers 62 and bypass dampers 58 have positions which are controlled by the modulating actuator 55 and the coupling means 57, and they are essentially independent of the motor 90. Clearly, actuation of the modulating actuator 55 for a mixed fresh air and re-circulating air configuration would not necessarily be identical to that for one hundred percent fresh air or re-circulating air actuation. With mixed fresh and re-circulating air as described, it is quite common to vary the ratio between daytime and nighttime, depending on the usage of the building.

Mixed air operation is as follows. After passing through the pre-filter 71, a first portion (broken outline arrow) of the fresh air passes through the inlet air flow path 74, and a second portion (full outline arrow) of fresh air passes through the re-circulating dampers 85. The first portion of air passing through the inlet air flow path 74 is divided into main and bypass flows by the main and bypass dampers 62 and 58 as previously described, after having been mixed with re-circulating air (full outline arrow) returning through the re-circulating dampers 86 in an amount dependent on the opening of the dampers 86. The remaining portion (broken outline arrow) of the re-circulating air passes through the barometric dampers 92 and is mixed with the second portion of fresh air passing through the re-circulating dampers 85, prior to both portions being mixed in the fan 70 and passing through the heat exchange coil 15 under the influence of the exhaust fan 70. Building duct characteristics will determine the actual degree of opening of the dampers 85 and 86 to attain the desired degree of fresh air and energy savings.

(d) Full Fresh Air Mode-Cooling

In a one hundred percent fresh air cooling mode, the telescopic coupling 57 is engaged and the face dampers 62 and the bypass dampers 58 modulate in inverse proportion to the signal 61 to control the main and bypass stream through and around the coil 16, now acting as an evaporator. The re-circulating dampers 85 and 86 are closed, and the barometric dampers 92 are fully open. Clearly, the auxiliary heater 82 is disabled.

Similarly, to the full fresh air heating mode, the exhaust air coil receives exhaust air from the space, which, in this mode, is usually at a temperature cooler than ambient. Consequently, temperature difference for the coil 15 is greater than-normal, and thus heat transfer is improved and "low temperature" that would normally be lost is partially reclaimed. In conventional air conditioning, an auxiliary fan usually drives outside air through the condenser coil, but by using the exhaust fan 70 to drive cooled room air through the condenser coil 15, the auxiliary fan which would otherwise normally be required, is eliminated. This is an extra advantage in the present invention. In summary, less energy is required for the invention as the coil 15 is operating in a lower temperature, which increases heat transfer and refrigerant sub-cooling, and the auxiliary fan is not needed.

(e) Full Re-circulating Air Mode-Cooling

In the one hundred percent or full re-circulating cooling mode, similarly to full re-circulating heating, the re-circulating dampers 85 and 86 are both opened and the bypass and face dampers 58 and 62 are decoupled and the dampers 58 are closed as shown in FIG. 3. Similarly, to full fresh air cooling, the coil 16 acts as the evaporator, and the coil 15 as the condenser. Return air from the space room being cooled passes directly through the re-circulating dampers 86 and the supply coil 16 and back into the space to be cooled. Similarly, fresh air is drawn through the re-circulating dampers 85 into the fan 70 and out through the exhaust air coil 15.

(f) Mixed Fresh/Re-circulating Air Mode-Cooling

Similarly to the mixed air heating mode, in the cooling mode mixed fresh and re-circulating air can be obtained by positioning the re-circulating dampers 85 and 86 in intermediate positions using the motor 90. In this position, the coupling means 57 are again engaged, permitting concurrent operation of the face dampers 62 and bypass dampers 58 to attain a desired flow of air in proportion to the instantaneous refrigerant condensing temperature. Similarly to the mixed air heating mode, fresh air entering the duct 76 through the main damper 62 is mixed with return air passing through the re-circulating damper 86, both of which then passes through the coil 16. The balance of return air not passing through the re-circulating dampers 86 passes through the damper 92 and mixes with some fresh air passing through the dampers 85 to be fed through the coil 15 by the fan 70.

Figure 4:
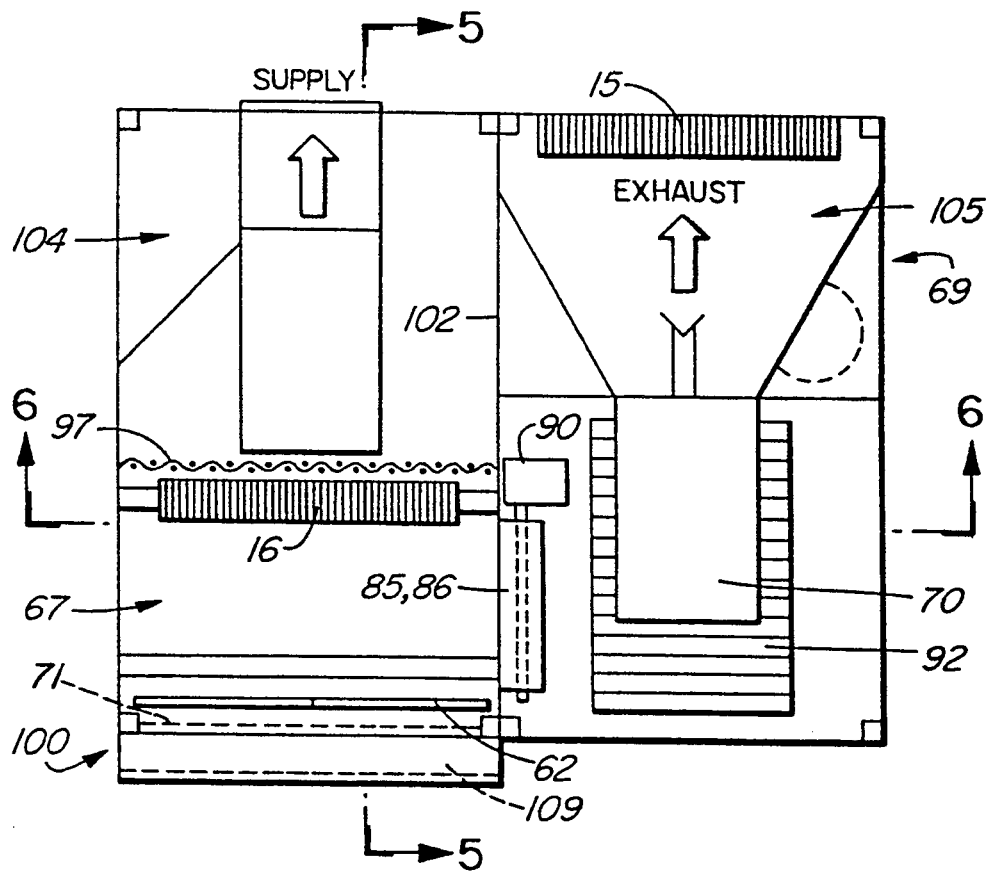
FIG. 4 is a simplified top plan as seen from lines 4—4 of FIGS. 5 and 6, shown partially in section, of a coupled system embodiment according to the invention showing relative location of various components, many other components being omitted for clarity.
Figure 5:
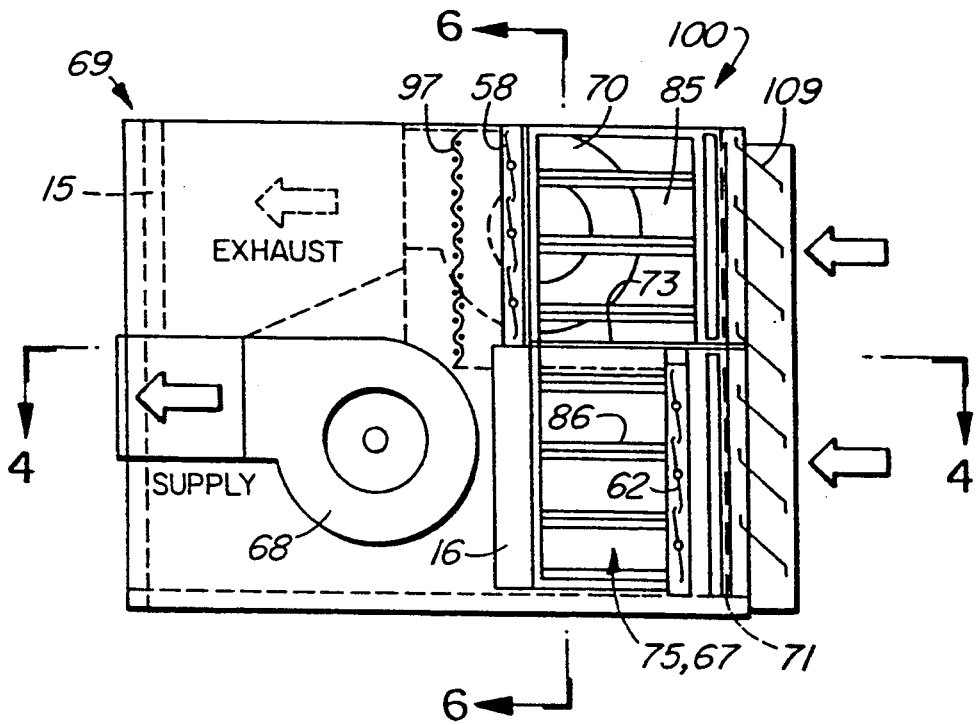
FIG. 5 is a simplified elevation and section of the apparatus as seen from line 5—5 of FIG. 4, some portions being omitted for clarity, the invention being shown in the one hundred percent re-circulating mode.
Figure 6:
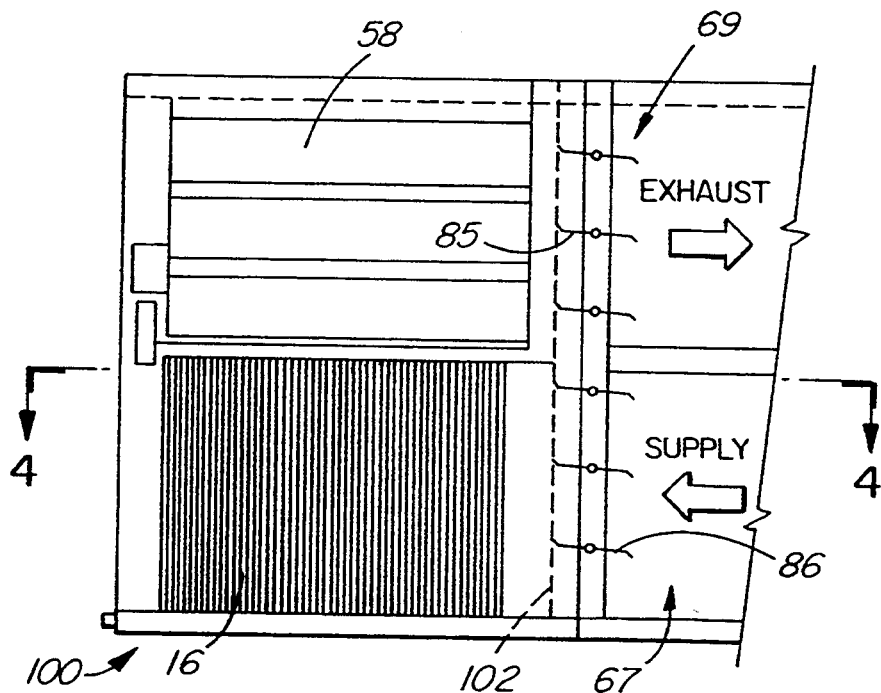
FIG. 6 is a simplified elevation of the apparatus as seen from lines 6—6 of FIGS. 4 and 5, some portions being omitted for clarity.

FIGS. 4 through 6

The apparatus 10 can be incorporated into a single housing 100 so that the supply and exhaust portions are "close-coupled", thus simplifying some construction. Alternatively, the supply and exhaust portions can be separated and fitted into separate housings (not shown) hich are located in different portions of the building. The description following relates to the close-coupled system which has certain advantages as will be apparent.

As seen best in FIG. 4, the housing 100 is a generally rectangular structure having a supporting framework, side, top and bottom panels and access doors, not shown, where required to facilitate servicing. The housing 100 is divided internally by a main vertical dividing wall 102 which separates supply and exhaust portions 104 and 105 respectively.

As also seen in FIGS. 5 and 6, the supply and exhaust fans 68 and 70 are mounted in lower and upper portions of the housing 100, so that the housing is also divided horizontally for purposes as will be described. Thus, the exhaust air coil 15 is located in a plane above the supply air coil 16 and displaced laterally therefrom, and the bypass damper 58 is located above and displaced laterally from the face dampers 62. The horizontal partition 73 prevents mixing of the main flow in the inlet chamber 75 and the bypass flow. Thus, the supply portion 104 has the supply chamber 67 having main and bypass ducts for receiving separate streams of air, and the horizontal partition 73 maintains separate main and bypass streams of air. The fan 68 serves as propulsion means for generating air flow through at least one of the ducts. Fresh air enters the housing through optional intake louvres 109 which can be installed to minimize entry of rain or snow into the system.

As previously described with reference to FIGS. 2 and 3, and as seen in FIG. 5, the inlet space 75 is defined in part by the face damper 62, the supply air coil 16 and the horizontal partition 73. The space 75 also has a side wall formed of the re-circulating dampers 86 (lower) which are coupled to the re-circulating dampers 85 (upper). As seen in FIG. 4, the dampers 85 and 86 are controlled by the motor 90 and are opened when the apparatus functions in the re-circulating mode or mixed fresh and re-circulating mode as previously described. Thus, the vertical dividing wall 102 has an aperture therein which is closed by the re-circulating dampers 85 and 86 when in the full fresh air heating mode as shown in FIG. 2, or in the full fresh air cooling mode, not shown. However, the dampers 85 and 86 are fully or partially opened when in the full or mixed re-circulating mode as shown in FIG. 3.

Thus, it can be seen that the re-circulating dampers 85 and 86 serve as re-circulating flow control means disposed between the supply chamber and the main space. The re-circulating flow control means are settable at either full open, full closed or at an intermediate setting in which the dampers 85 and 86 are partially open to attain the mixed flow. The re-circulating flow control means in effect form a first openable partition, i.e. the first and second re-circulation dampers 85 and 86, between the supply and exhaust chambers 67 and 69 to permit communication therebetween when the re-circulating flow control means are open. This is shown in FIG. 3, and to control flow it can be seen that the exhaust chamber 69 has a second openable partition, namely the barometric dampers 92 and the face dampers 62. The dampers 92 divide the exhaust chamber 69 into a return portion and an exhaust portion communicating with the space to be heated and atmosphere respectively. The return portion is bounded by the closed dampers 92 and 62, and at least some air from the main space is re-circulated through the dampers 86 and the coil 16. The exhaust portion is also bounded by the closed dampers 92 and 62, and at least some fresh air is drawn through the open dampers 85 and the coil 15.

Thus, when the invention is assembled into a single unit as shown, the various dampers serve as a convenient openable partition means for diverting the air between adjacent chambers, depending on the mode of operation of the system. This simplifies considerably ducting and servicing, as the whole unit can be accessed and serviced in a compact space.

FIGS. 2, 3, 7 and 8

As seen in FIG. 2, the face and bypass dampers 62 and 58 are selectively mechanically connected together with the telescopic coupling means 57, and the dampers 62 are directly coupled to the modulating actuator 55. When engaged, the telescopic coupling means 57 rigidly interconnects the dampers 58 and 62 to operate in the inverse proportional relationship as previously described. As seen in FIG. 3, when the coupling means is disengaged, the bypass dampers 58 are de-coupled from the face dampers 62, and are free to close automatically, while the dampers 62 operate alone in response to actuation of the modulating actuator 55. The telescopic coupling means 57 has a provision to disconnect and reconnect the inverse proportional coupling between the face and bypass dampers which is for use in the re-circulating modes, see FIG. 10 description.

Figure 7:
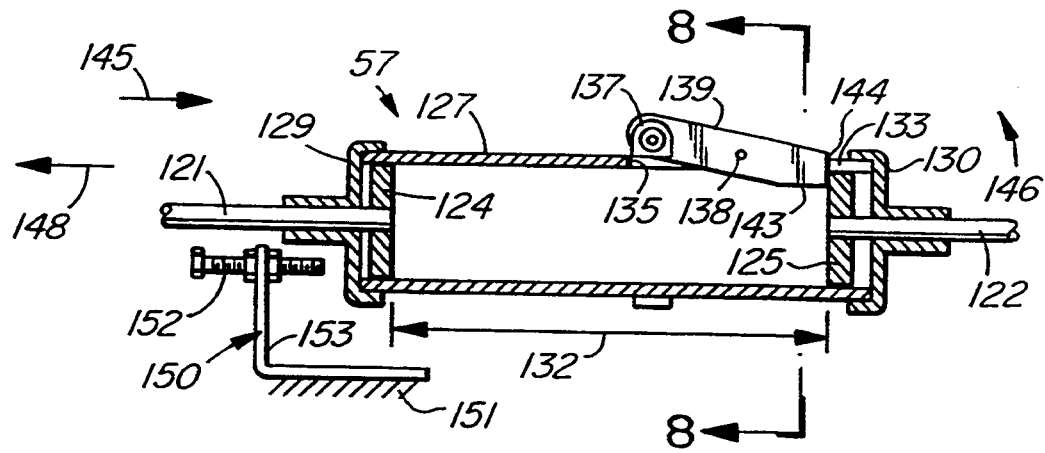
FIG. 7 is a simplified longitudinal section through a coupling device according to the apparatus, the device being shown in an extended or uncoupled configuration.
Figure 8:
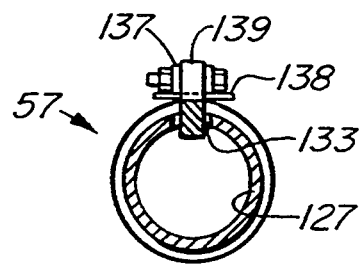
FIG. 8 is a simplified section on line 8—8 of FIG. 7.

Referring to FIGS. 7 and 8, the coupling means 57 comprises first and second rods 121 and 122 which have outer ends coupled by radius arms, not shown, to the main dampers 62 and bypass dampers 58 respectively, not shown in FIGS. 7 and 8. The rods 121 and 122 have inner ends fitted with a magnet 124 and an armature 125 respectively. The magnet and armature are discs of generally similar size, which are fitted for sliding movement within a tubular body 127. The body has first and second end caps 129 and 130 fitted with aligned bores to receive the first and second rods 121 and 122 respectively and to enclose ends of the body 127. Preferably the magnet 124 is a ceramic permanent ring magnet, and the armature 125 is a steel washer which is attracted to the magnet when in close proximity thereto. Spacing 132 between opposed faces of the magnet and armature equals full stroke of the actuator 55 which is necessary to move the dampers 58 between fully closed and fully opened positions.

The body 127 has an axially aligned, elongated clearance slot 133 adjacent the end cap 130 remote from the magnet, the slot extending inwardly from the end cap 130 to an inner end 135 of the slot. A bracket 137 is located adjacent the inner end 135 and journals a latching arm 139, which can slide into the slot as seen in FIGS. 7 and 8. A transverse pin 138 extends laterally through the arm and interferes with the body 127 to prevent excessive movement of the arm 139 into the body. The arm 139 has an outer end 141 which has mutually perpendicular longitudinal and radial faces 143 and 144, the terms longitudinal and radial referring to the body 127. In FIG. 7, the coupling 59 is shown in an extended or disengaged position in which the damper 58 is de-coupled from the actuator 55, as found in the re-circulating mode. In this position, the magnet 124 is adjacent the end cap 129, and the armature 125 is retained adjacent the end cap 130 by the latching arm 139 which has passed into the clearance slot 133 so that the radial face 144 is against the armature 125. A decoupling stop 150 is located on an adjacent surface 151 to prevent further movement of the means 57 in the direction of the arrow 148. The stop includes a bracket 153 with an adjusting screw 152 which can be adjusted so that the screw 152 contacts the end plate 129 so as to hold the bypass dampers closed when the coupling means 57 disengages the actuator 55 (FIG. 3).

FIGS. 7, and 9 through 11

Figure 9:
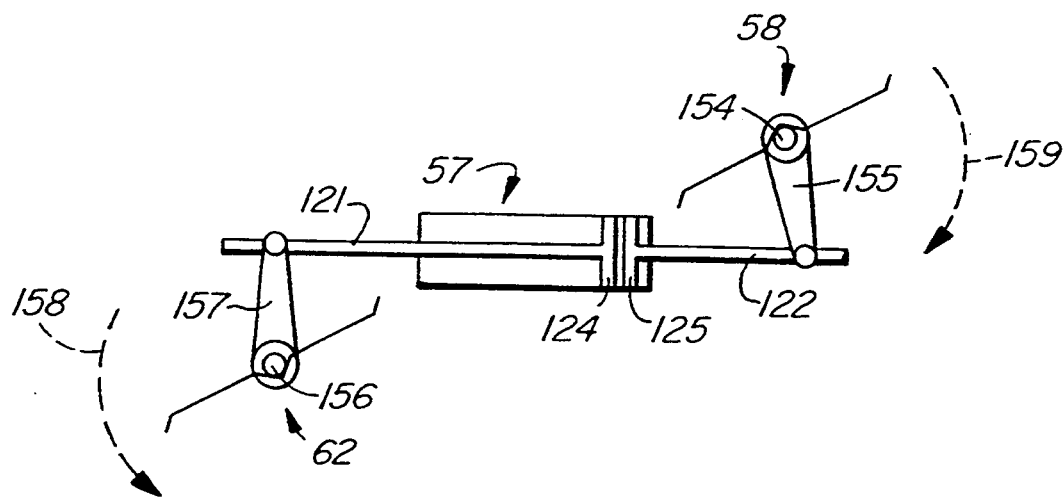
FIGS. 9, 10 and 11 are simplified diagrams showing actuation of the coupling device and dampers.

FIG. 9 shows the coupling means 57 in an engaged configuration in which the armature 125 is retained against the magnet 124 so that the rods 121 and 122 are effective axially joined together to function as a single rod. Single blades of the dampers 58 and 62 are shown, the remaining blades being coupled in accordance with common practice. The blade of the bypass dampers 58 has a bypass damper spindle 154 and a bypass damper radius arm or lever 155 extending therefrom. The dampers are positioned so that the spindle is generally horizontal, and blades of the dampers are offset so as to be unbalanced so as to close under gravity, that is, the dampers 58 are gravity biased to automatically close. The blade of the face dampers 62 has a face damper spindle 156 and a face damper radius arm or lever 157 extending from the spindle as shown. The spindle 156 is similarly journalled horizontally, and the face dampers are coupled to an output shaft of the actuator 55 not shown. The first and second rods 121 and 122 are connected to the levers 157 and 155 respectively so that rotation of the spindle 156 by the actuator 55 results in a corresponding rotation of the spindle 154. Thus, when the coupling means 57 is engaged as shown in FIG. 9, rotation of the lever 157 in an anti-clockwise direction per an arrow 158 rotates the lever 155 in a clockwise direction per an arrow 159.

Figure 10:
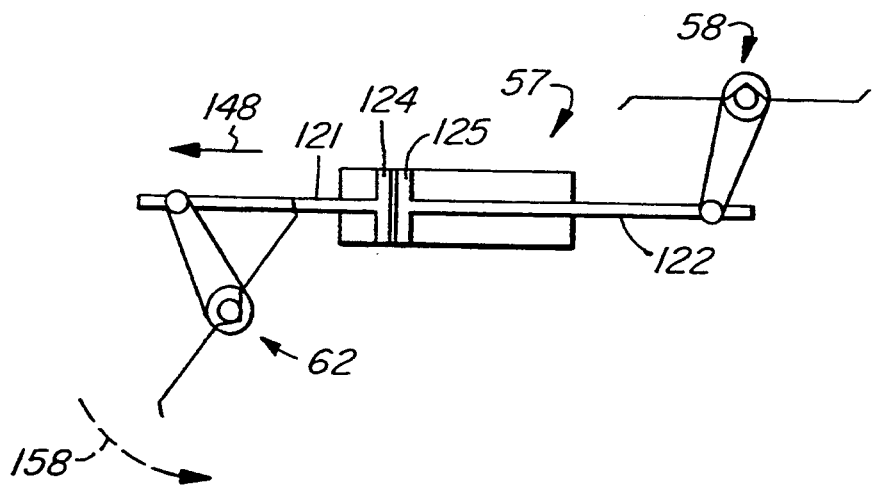

Referring to FIG. 10, for the apparatus to shift from a full fresh air or mixed fresh and re-circulating air configuration to a full re-circulating configuration the dampers 58 and 62 must de-couple as follows. The face dampers 62 are rotated anti-clockwise towards a fully closed position as shown by the arrow 158, which in turn draws the rod 121 in direction of the arrow 148 which rotates the bypass dampers 58 anti-clockwise to the fully open condition. The stroke and length of the rods are adjusted so that bypass dampers reach the fully open position before the face dampers are completely closed. Further travel of the rods 121 and 122 to fully close the face dampers exerts an excessive force between the magnet 124 and the armature 125, which force overcomes the magnetic attraction so that the rods eventually separate at a threshold position as seen approximately in FIG. 10. This permits full closure of both the face dampers and the bypass dampers in the full re-circulating mode.

Figure 11:
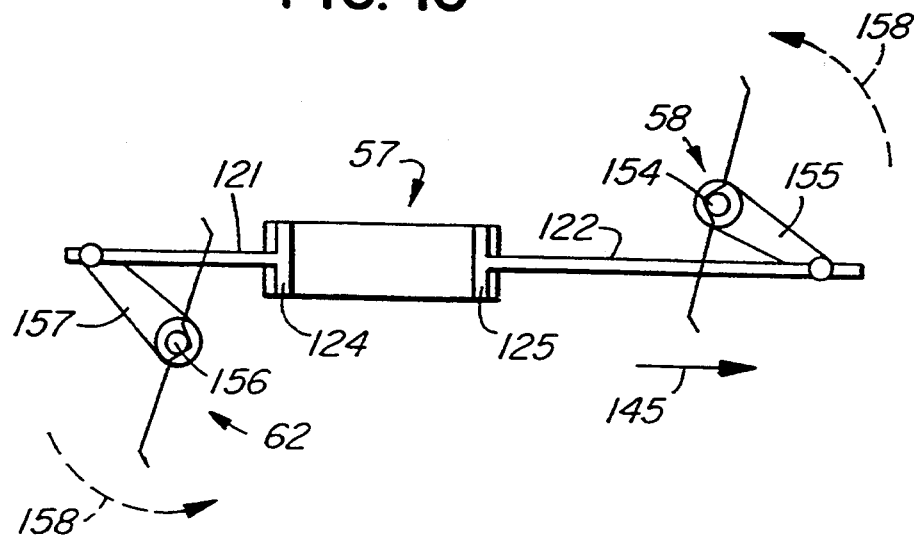

Referring to FIG. 11, the spindle 156 of the face dampers 62 continues rotation in direction of the arrow 158 until the dampers 62 attain the fully closed position. When the armature 125 is released from the magnet, force from the gravity biased bypass dampers 58 rotates the spindle 154 in the direction of the arrow 158 and draws the rod 122 outwardly through the body 127 in direction of the arrow 145 until the latching arm 139 and the armature 125 assume the position as shown in FIG. 7. In this position the bypass dampers are locked closed by both the latching arm 139 and the decoupler stop 150.

The coupling means 57 permits either simultaneous inversely proportional movement of the dampers, or closing of the bypass dampers with independent opening and closing of the face dampers. Other means can be substituted to attain the same result, e.g. use of a separate, independently controlled actuator to control the bypass dampers. Thus, the coupling means 57 further includes de-coupling means cooperating with the coupling means to de-couple the main flow control means from the bypass means as required, so as to cancel the inverse proportional relationship between the flow control means. In summary, when coupled together, the first and second rods are operatively connected together to provide the inverse relationship, and can be separated as required to permit closure of bypass dampers and independent operation of the main dampers.

The coupling means 57 can be retracted by reversing the above procedure, which occurs when the coupling means 57 is required to re-couple the face and bypass dampers. As seen in FIG. 7, the rod 121 is moved axially inwardly into the body 127 per arrow 145, so that as the magnet 124 approaches the armature 125, the magnet pushes against the latching arm 139, and across the longitudinal face 143 swinging the arm outwardly through the slot in direction of an arrow 146. When the magnet 124 contacts the armature 125, the latching arm 139 is maintained disengaged from the armature 125. Thus, as the rod 121 moves outwardly in direction of the arrow 148, the armature and rod 122 can then move concurrently with the rod and magnet 124, thus moving the entire coupling means to reopen the bypass dampers 58 as described.

Thus, in summary, when the armature 125 and the magnet 124 are in contact, the coupling means 57 is coupled or in retracted condition, as shown in FIG. 9, and the bypass dampers move in inverse proportion to the face dampers. However, when the coupling means 57 is de-coupled by passing the threshold position as shown in FIG. 10, the face dampers become independent of the bypass dampers which remain closed until the coupling means 57 is re-coupled.

It can be seen that the body 127 serves as a guide means for guiding extension and retraction movement between the first and second rods 121 and 122. Also, it can be seen that the magnet and armature 124 and 125 respectively serve as magnetic means for coupling together inner ends of the rods. The latching arm 139 serves as a retaining means for retaining one rod in a position while magnetic force coupling the rods together is overcome, permitting the rods to separate and de-couple the flow control means.

Figure 12:
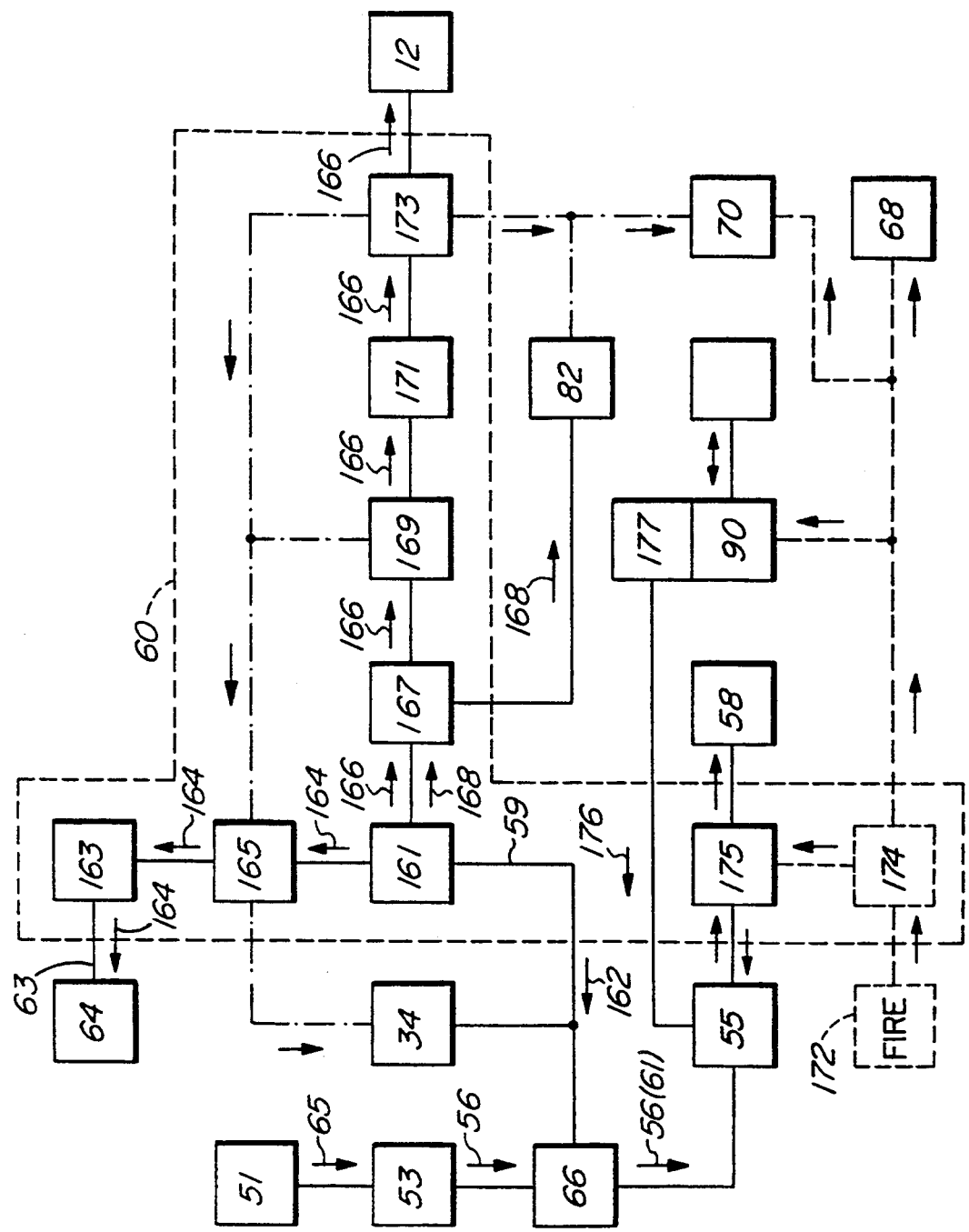
FIG. 12 is a simplified electrical schematic showing a portion of electrical control means, and some mechanical components which are actuated electrically, some significant signals and some connections to other components are also shown.

FIG. 12, with some references to FIG. 1

The term "signal" herein refers to generation of an electrical characteristic, or fluid pressure or equivalent which is used to actuate or enable a component. The signal can change in magnitude and other characteristics as it passes through several components, but even after such changing it is still referred to as the original signal. For example, an electrical signal when initially generated can be too small, and requires amplification before usage. The numerical designation of such a signal does not change as it passes through the components which can change its characteristic.

A portion of an overall control system 160 is shown, in which the components are shown actuated for the heating mode. A room thermostat 161 is in the room or air space to be heated and initiates a demand for heat when the actual temperature drops below a pre-set desired temperature commonly termed the thermostat set-point, but defined herein as a predetermined second reference temperature as will be described. Hereinafter and in the claims, the actual temperature of the air space can be termed the "actual second reference temperature", and the pre-set desired temperature or thermostat set-point is termed "pre-determined second referenced temperature". Difference between the actual and the pre-determined second temperatures is known as the set point deviation. The demand for heat initiates a thermostat output signal which has three functions which are considered as three separate thermostat signals from the thermostat 161 as follows.

In response to the actual temperature signal 65 from the sensor 51 (measuring the refrigerant condensing temperature), the proportioning controller 53, in turn generates the first control signal 56 to the modulating actuator 55 to control the dampers as previously described. A first thermostat signal 162 is an enabling or "changeover signal" which is fed along the lead 59 (FIG. 1) to the damper relay 66 and then to the actuator 55 to enable the actuator 55. The signal 162 is "low" in the heating mode, and "high" in the cooling mode, and also serves to switch the valve 34. The damper relay 66 is a DP/DT relay which can invert the first control signal 56 from the controller 53 as needed for cooling. In the heating mode, a damper relay output signal 61 is identical to the signal 56, whereas in the cooling mode, the damper relay 66 inverts the signal 56 which causes signal 61 to be equal but opposite to the signal 56. Thus, during the cooling mode, the enabling or changeover signal 162 from the thermostat 161 to the actuator 55 is inverted by the relay 66 for reverse operation of the dampers 58 and 62. The relay thus produces equal and opposite signals for equal lower or higher deviations from the thermostat set point.

The room thermostat 161 also generates a second thermostat signal 164 which is a voltage signal proportional to the set point deviation and is fed through a multi-contact relay 165 to a DC amplifier 163 which amplifies the signal and feeds it to the motor 64 which controls the modulating suction cut-off valve 37. The signal 134 has a linear characteristic dependent upon user defined throttling range, and is present whenever set point deviation exists except when there is a negative set point deviation in the cooling mode, or a positive set point deviation in the heating mode, in which case the second signal 164 is at its lowest value (zero volts DC). The second signal 164 is inverted and amplified as it passes through the amplifier 163 and then fed to the motor 64 to vary size of a flow restricting orifice in the valve 37. With a full heating demand, the valve 37 is maintained in a fully opened position to permit full flow of refrigerant to compressor, and then to the condenser or supply coil 16 (FIG. 1) to provide maximum heat output from the apparatus to satisfy the thermostat demand. The second thermostat signal 164 represents the set point deviation, i.e. difference between an actual second reference temperature (i.e. the actual air temperature) and the desired air temperature or thermostat set point (previously defined as the predetermined second reference temperature). The difference between the actual second reference temperature and the predetermined second reference temperature is referred to as a second temperature difference in the claims and is important to the invention and after processing is defined as the second control signal 164.

Third and fourth thermostat signals 166 and 168 are generated by the thermostat 161 and fed to an air proving switch 167 and interlocked thereby. Both signals 166 and 168 can be blocked by the air proving switch 167 if insufficient supply air flow through the supply fan 68 is sensed. The third signal 166 continues through another air proving switch 169 and is further interlocked thereby. The air proving switch 169 can block the signal 166 if there is insufficient air flow through the exhaust fan 70. If both air proving switches provide acceptable signals, the signal 166 then proceeds to a compressor protection circuit 171. It is further interlocked in the circuit 171 and then passes through a defrost logic circuit 173 and eventually starts the motor compressor 12 if all interlocks are satisfied. The fourth signal 168 continues from the air switch 167 to energize the auxiliary heater 82 whenever the fourth signal is present and the interlock is satisfied. The diagram shows that the reversing valve 34 does not receive a signal when the thermostat 161 is calling for heat as this is a biased valve which, when non-energized, is biased to the position shown in FIG. 1, which as previously stated, discloses the heating mode.

The defrost logic circuit 173 provides demand defrost for the exhaust coil. The circuit 173 can be a known unit and has a group of components which sense when the exhaust coil 15 starts to accumulate frost, that is accumulate ice on the outside, which restricts flow therethrough. If ice accumulates, the demand defrost initiates a defrost cycle, and it also senses when the defrost cycle should terminate. Defrost logic is passive until required, and is only normally required in the one hundred percent re-circulating heating mode. Because the exhaust coil 15, which is acting as an evaporator in the heating mode, will always be operating above 0° C. (32° F.) the exhaust air should never be less than 20° C. (70° F.) in the one hundred percent fresh air heating mode. But, should an exhaust fan air switch fail, the defrost logic will prevent a "snowball" effect resulting in blocking the coil 15 with ice.

The operating motor 90 of the re-circulating dampers 85 and 86 is controlled by a remote positioner 170 which is typically a three-terminal potentiometer which controls balancing relays or the electronic equivalent within a proportioning motor. The remote positioner 170 positions the motor 90 to satisfy interior ventilation requirements of the building. It can be operated manually adjacent thermostat 161 or can be an integral part of a thermostat 161 or be substituted with automatic controls that proportionally respond to high interior humidity and/or carbon dioxide levels.

An end switch 177 is an adjustable micro-switch which is actuated by the motor 90 when the re-circulating dampers 85 and 86 (FIGS. 2 and 3) are less than ten percent open (e.g. effectively closed to prevent re-circulating). The switch 177 generates an end switch signal 176 which activates a decoupling means 175 to decouple the bypass dampers 58.

A shut-down relay 174 is provided for an emergency situation such as might arise in a fire. A fire/smoke detection switch 172 is coupled to the relay 174 and the relay 174 can be used to decouple bypass dampers 58 from the modulating actuator 55 by activating the decoupling means 175. The decoupling means can be an electrical signal which simulates driving the face damper 62 to a closed position, which automatically decouples the bypass dampers 58 as previously described with reference to FIGS. 7 through 10. Alternatively, a signal can be generated which actuates the modulating actuator 55 to actually drive the face dampers to the closed position, which would also result in decoupling of the coupling means 57 as previously described. Equivalent means to permit decoupling between the face and bypass dampers can be devised to suit particular installations. The relay 174 when actuated can close the face dampers 62 by actuating the motor 55 and also can close the re-circulating dampers 85 and 86 by actuating the motor 90. This isolates the building from the outside, thus preventing any measurable flow of air into the building. The fans 68 and 70 are also stopped, which triggers the air proving switches 167 and 169 to shut down the compressor 12 and auxiliary heater 82, thereby disengaging all heating and cooling equipment within the system.

For changing to the cooling mode, a signal from the thermostat 161 is fed to the reversing valve 34 (FIG. 1) to shift the valve 34 to the opposite position, not shown. This reverses flow in some conduits as described, and some of the system then operates as a normal air conditioner. However, in the cooling mode, the motor 64 modulates the suction cut-off valve 37 in response to the second signal as will be described. The auxiliary heater 82 is maintained de-activated by the thermostat 161 as the fourth signal 168 is not present in the cooling mode.

OPERATION (a) Full Fresh Air Mode-Heating

Referring to FIGS. 1, 2 and 12, a description of one hundred percent fresh air heating mode is as follows. The fan 68 generates main and bypass streams of air which flow along the main duct 76 and bypass duct 77 respectively, the two streams of air being maintained separate from each other by the partition 73. The main stream of air is directed through the coil 16 which acts as a condenser of vapour compression heat pump and heats the main stream of air.

The controller 53 is pre-programmed by the installer to establish the pre-determined base or first reference temperature which is the pre-determined or "ideal" refrigerant condensing temperature. This "ideal" temperature is a compromise between efficiency and comfort and is dependent upon the pressure of the system, type of refrigerant used and other parameters. The sensor 51 is located on the outlet of the condenser coil 16 and thus detects actual refrigerant condensing temperature. The first actual reference temperature 65 outputted by the sensor 51 is fed into the controller 53, compared with the pre-determined first temperature and the difference is outputted from the controller 53 as the first control signal 56, as previously described with reference to FIG. 1. This first control signal is fed along the lead 54 to the damper relay 66, and is unchanged as the relay output signal 61, and is fed to the actuator 55 which, as previously described, controls the dampers. It is noted that the first thermostat signal 162 is ineffective until the thermostat generates the third signal 166.

In response to the first control signal from the controller 53, the actuator 55 positions the face dampers 62 and thus also positions the telescopic coupling means 57 to control opening of the dampers 58 to control flow of the bypass air in response to the first control signal. Thus, if the first control signal 56 reflects an actual first reference temperature 65 below the predetermined first reference temperature, the dampers 62 close slightly, and the dampers 58 open slightly so that the bypass flow is increased. Conversely, if the first signal reflects an actual first reference temperature above the predetermined first reference temperature, the bypass flow is decreased by reversing the above damper movement. The final step of the heating process is mixing the main stream of air after passing through the condenser 16 with the bypass stream of air, if any air were passed through the bypass dampers 58, prior to delivering the mixture of air streams to the space to be heated through the fan 68. As described previously with reference to FIGS. 9 through 11, the inverse proportionality between the bypass dampers 58 and face dampers 62 permits controlling the main stream of air also in response to the first signal in an inverse flow ratio to the bypass stream of air. In this way, as flow through the bypass duct increases, flow through the main duct decreases and vice versa while maintaining constant volume flow of air into the space. It can be seen that the face dampers 62 and bypass dampers 58 serve as main flow control means and bypass flow control means which cooperate with the main duct and bypass ducts respectively to control flow therethrough. Together, the dampers 58 and 62 comprise air flow control means for controlling ratio of flow of streams of air through the main and bypass ducts.

The second thermostat signal 164 from the thermostat 161, after passing through the relay 165 and processing by the amplifier 163, is outputted to the motor 64 to control flow in the suction line 36 by modulating the valve 37. For a normal full demand for heat, the valve 37 is maintained open, thus permitting normal maximum operation of the evaporator, that is, the exhaust heat exchanger 15 which is positioned upstream (i.e. with respect to refrigerant flow) of the compressor 12. As the actual second reference temperature (i.e. actual room temperature) approaches the predetermined second reference temperature, (i.e. the thermostat set point or desired air temperature) the difference between these temperatures diminishes. This difference is the second control signal 164, and the greater the difference, that is, the set point deviation, the larger the signal 164. The larger the signal 164, the greater the movement of the valve 37 from the full open position, and for a maximum signal, the valve 37 is fully closed, following compresser shut-down. As the restriction through the valve is increased, flow of refrigerant through the valve decreases, causing the refrigerant vapour leaving the evaporator to be of lower density than with a full flow valve. Thus, the evaporator operates at an artificially high pressure while the compressor (which has an intake exposed to suction downstream of the modulating cut-off valve 37) operates at a lower than normal pressure, that is the compressor is starved of refrigerant. Thus, the condenser heat rejection is reduced in proportion to control signal by inhibiting the ability of the evaporator to gather heat from air leaving the building in the exhaust stream.

Also, volumetric efficiency of the compressor is diminished in inverse proportion to the compression ratio which further reduces system capacity. The de-superheating expansion valve 28 prevents compressor overheating while operating under these conditions for sustained periods by admitting a small amount of refrigerant into the compressor as required. It can be seen that the valve 37 is automatically positioned in response to the second control signal 164 from the thermostat 161 reflecting heating demand. As the heating demand decreases, the valve is gradually shifted proportionally towards the minimum flow position. Thus, the valve is modulated so as to balance the condenser heat rejection to the fresh-air heating load, thus maintaining a constant supply air temperature throughout throttling range of the valve 37.

As previously stated, the higher internal evaporator pressure caused by the throttling action of the valve 37 results in a higher boiling temperature of the refrigerant passing through the evaporator. This reduces the net temperature difference between the evaporator air stream which decreases the heat gathered by the evaporator which in turn decreases the condenser demand or heat rejection. As the total heat rejection at the condenser is equal to the heat gathered in the evaporator plus the heat of compression, it follows that heat rejected at the condenser, termed condenser demand, can be controlled by controlling the amount of heat gathered in the evaporator.

The said modulation of the valve 37, which gradually reduces refrigerant flow, prevents cold ambient air from entering the building during continuous fresh-air supply. Use of the valve reduces considerably the off-cycle periods of the refrigeration plant when the refrigeration plant output would normally exceed the fresh-air heating demand. When the air space temperature is satisfied with respect to the second control signal, the compressor which is controlled by the third control signal is interrupted. This is to prevent sustained compressor operation while the modulating valve is fully closed. When outdoor conditions and air quantity supplied exactly equal internal space requirements, a state of thermal balance exists, and the compressor is not required. It can be seen that the valve 37 effectively provides capacity control of a heat pump without a multi-stage or multi-speed compressor, and thus provides a considerable simplification and improved control precision over control systems of prior art heat pumps.

Thus, the heat pump maintains temperature in the room as controlled by the thermostat without surges of cold air which would otherwise be generated when the refrigeration plant output is greater than the building heating demand as in prior art machines. As a consequence, the more uniform temperature results in less cycling "on and off" of the compressor, increasing life of the motor and compressor.

Usually, a normal heating demand signal from the thermostat 161 positions the valve 37 to a fully open condition so that heating output is at a maximum. When the compressor initially starts to pressurize refrigerant, in response to the initial full demand of the second control signal from the thermostat, temperature at the sensing bulb 44 is initially increased. This will cause the de-superheating thermostatic expansion valve 28 to admit liquid refrigerant from the liquid line 27 into the suction line 42, via the pressure vessel 30. This lowers the compressor discharge temperature, and high pressure heated vapour passes through the reversing valve 34 into the vapour line 38 towards the supply coil 16. In the coil 16, the refrigerant condenses, passing heat into the supply air, and liquified refrigerant bypasses the expansion valve 46 through check valve 48 to arrive at the junction 24. Clearly, the temperature sensor 51 detects the temperature of this liquid refrigerant, which in conjunction with the proportioning controller 53, positions the dampers as required. It is added that if the condensing temperature at the sensor 51 becomes too low, the proportioning controller 53 re-positions the face dampers to reduce flow through the coil 16, and, through the inverse proportional coupling 57, opens the bypass dampers 58 to a wider position to maintain constant air volume to the supply fan 68. In effect, the air quantity through the supply coil 16 is modulated by the face dampers to attain optimum refrigerant condensing temperature. It is added that the thermostatic expansion valve 23 on the exhaust coil 15 functions in a normal manner, in response to outlet temperature from the exhaust coil as detected by temperature sensor 26.

When the liquid refrigerant passes through the expansion valve 23, the pressure in the exhaust coil 15 drops so that the refrigerant boils and the resulting vapour gains heat from air drawn through the exhaust coil by the fan 70. The resulting vapour is slightly super-heated and is drawn towards the compressor through the reversing valve 34 and then to the modulating suction cut-off valve 37. As stated previously, the cut-off valve 37 partially controls the compressor compression ratio and thus the heat gathered and rejected, as well power consumed by the compressor. Gas drawn through the valve 37 passes into the pressure vessel 30 which traps liquid refrigerant to avoid being drawn into the compressor. The compressor is suction cooled, but if the compressor begins to overheat, the de-superheating expansion valve 28, controlled by the sensor 44, will admit sufficient liquid refrigerant into the suction line to lower the gas superheat to cool the compressor. Usually, the only time this would occur would be during prolonged periods of compressor operation at minimum load.

In summary, the above description relates to operation of the apparatus in the full fresh air heating mode wherein operation of a refrigeration plant operating in reverse as a heat pump is enhanced by three distinct and independent optional aspects as follows:

(i) The first aspect is to maintain constant volume of flow into the space by using face and bypass dampers to control flow through two parallel inlet ducts. The dampers are modulated in inverse proportion to each other in response to the first control signal generated by refrigerant condensing temperature. This permits matching of the rates of condensing (in heating mode) and evaporating (in cooling mode) of the refrigerant so that if the condensing temperature becomes too low, air flow through the condenser is reduced by increasing flow in the bypass duct, thus matching heat gathered at the evaporator with heat removed at the condenser.

(ii) The second aspect of the invention relates to system capacity control by gradually reducing heat output from the condenser as the room temperature rises to attain the desired room temperature, that is as set point deviation decreases and approaches zero. The set point deviation generates a second control signal which is used to modulate the suction cut-off valve 37 disposed between the evaporator and the compressor intake, so that as the set point deviation decreases, restriction of flow from the evaporator to the compressor is increased. The flow restriction maintains an artificially high pressure over the evaporator, thus raising evaporator temperature and simultaneously reducing mass flow of refrigerant through the compressor due to decrease in density of the refrigerant due to the restriction. Thus, less heat is removed in the evaporator, and correspondingly, less heat is available at the condenser, enabling a tapering effect of heating until the set point deviation is zero.

iii) In the fresh air and mixed fresh/re-circulating air heating modes, the exhaust heat exchanger (the evaporator) captures some heat from the heated air in the space, before the heated air is exhausted to atmosphere. Capturing this heat increases overall efficiency of the unit when compared with locating the evaporator in another, usually colder, heat exchange medium, such as outside air.

b) Full Re-circulating Air Mode-Heating

As briefly described previously, in the full re-circulating mode, as seen in FIG. 3, disconnection of the coupling means 57 results in full automatic closure of the bypass dampers 58, and independent operation of the face dampers 62 in response to the first signal fed into the actuator 55. All heated return air from the room passes through the re-circulating dampers 86, and then through the heat exchanger 16 under the influence of the fan 68. Fresh air passes through the pre-filter 71 and the re-circulating dampers 85 under the influence of the fan 70, and is then passed through the exhaust heat exchanger 15. As with the full fresh air heating, the suction cut-off valve 37 is modulated in response to the set point deviation, thus obtaining the benefits as previously described.

(c) Full Fresh Air and Full Re-circulating Air Modes-Cooling

The above three features have equivalent applications also in the cooling mode, and provide similar but opposite advantages to those in the heating mode, and are briefly described as below. As in the heating operation, much of the cooling operation follows conventional practice and is not described in detail. The main differences relating to the three aspects of improved cooling are described briefly as follows.

In response to the temperature signal from the sensor 51, the proportioning controller 53 in turn generates the first control signal 56. To initiate a cooling cycle, the first thermostat signal 162 to the actuator 55 is fed along the lead 59 and to the damper relay 66 so as to enable the actuator 55. As this is in the cooling mode, the signal 162 is high, causing the damper relay 66 to invert the signal 56 from the controller 53 into the inverted output signal 61, which is fed to the modulating actuator 55 to control the dampers 62 and 58 in a reverse mode to that used in the heating mode as follows. The "high" signal 162 also switches the valve 34 for cooling. Thus, in the cooling mode, the exhaust coil 15 is now a condenser and rejects heat to exhaust air leaving the space, at least in the full fresh air or mixed fresh and re-circulating air mode. If there is insufficient cooling of the condenser by the exhaust air, refrigerant condensing temperature will rise and this will affect the first signal generated by the temperature sensor 51 in the exit from the exhaust coil 15. The face and bypass dampers will then respond in the opposite direction with respect to the heating mode, that is the face dampers 62 will tend to close, thus reducing air flow through the supply coil 16, acting as an evaporator, and instead increasing flow through the bypass duct. This tends to reduce heat gathered at the evaporator, which in turn reduces condenser demand or heat rejection requirement at the condenser, and thus reduces overloading of the system. Thus, rates of evaporation and condensation are now matched.

The second thermostat signal 164 represents the set point deviation, that is difference between the actual air temperature and the desired air temperature or thermostat set point. The second thermostat signal 164 is fed to the relay 165, to the amplifier 163, and then to the motor 64 which controls the modulating suction cut-off valve 37. With a full cooling demand, the valve 37 is maintained in a fully opened position to permit full flow of refrigerant from the evaporator, namely the supply heat exchanger 16, to the intake of the compressor, to provide maximum cooling to satisfy thermostat demand. The third and fourth thermostat signals 166 and 168 function as similarly described for the heating mode, as does also signals through the defrost logic circuit.

As the actual room temperature lowers towards the desired room temperature, set point deviation decreases and the second control signal to the modulating valve is gradually reduced. This gradually increases restriction of valve 37 which reduces flow through the valve 37, thus increasing evaporator pressure, and thus artificially raising the evaporating temperature, which in turn reduces the cooling affect of the evaporator and thus temperature of cooled air increases gradually. In this way, the air temperature discharged from the air conditioner system more gradually approaches the set point temperature, resulting in more uniform cooling, in a manner similar to the more uniform heating of the previously described heating mode.

In the full fresh air mode only, as previously described, cooled return air from the room passes through the exhaust coil 15 (condenser) and, as it is usually at a lower temperature than ambient air, will result in improved cooling of the condenser and thus improving overall efficiency of the system, due to recapturing some of the "low temperature" from the exhausted air prior to passing to atmosphere.

(d) Mixed/Fresh Re-circulating Air Mode-Heating and Cooling

As previously discussed, a third mode, namely a mixture of fresh and re-circulating air, can be obtained by partially opening the re-circulating dampers 85 and 86, in combination with modulation of the face and bypass dampers 62 and 58.

Referring to FIG. 3, in the mixed air heating mode, fresh air passing through the pre-filter 71 is divided into a first portion passing through the bypass duct 77, a second portion passing through the face dampers 62 and thus into the main duct 76, both portions being drawn by the fan 68, and a third portion passing through the partially open re-circulating dampers 85 under the influence of the fan 70. As in the full fresh air heating mode, the dampers 62 and 58 are proportioned in accordance with the first control signal, and fresh air passing through the supply heat exchanger 16, now operating as a condenser, is heated and discharged, together with the bypass stream by the supply fan 68 into the space to be heated.

Return air from the space also enters the unit, and a first portion of the return air passes through the barometric dampers 92 under the influence of low pressure generated by the exhaust fan 70, to be mixed with the third portion of fresh air passing through the re-circulating dampers 85. Both exhaust and fresh air are mixed in the fan 70 and then pass out through the exhaust heat exchanger 15, now acting as the evaporator. The return air passing through the re-circulating dampers 86 is mixed with the second portion of the fresh air passing through the face damper 62 and thus assists in warming the fresh air passing through the supply heat exchanger or condenser 16. As the room air will be warmer than the outside air, condenser temperature will rise, thus reducing demand from the heating system and permitting recovery of some energy from the exhaust air. If the condensing temperature should drop due to excessively cold fresh air entering the system, the face dampers 62 will tend to close, while the bypass dampers 58 will tend to open as before. As long as the pressure drop across the supply heat exchanger 16 remains essentially constant, volume of return flow through the dampers 86 into the main duct 76 should remain constant, regardless of the air flow through the bypass duct.

Clearly, volume flow of air entering the exhaust fan 70 is the combination of flow of heated exhaust air flowing through the barometric dampers 92, and cooler fresh air flowing through the re-circulating dampers 85. The mixing of these two flows by the fan 70 produces a warmer flow of air through the coil 15 than if fresh air alone were used, thus permitting recovery of some energy from the exhaust air. Thus, the mixing or combination of flows passing through the supply or exhaust fans permits recovery of some heat energy while also providing some fresh air. While the re-circulating dampers 85 and 86 are shown coupled, so as to open and close equally, for some mixed air applications it might be desirable to have a non-linear relationship between the dampers 85 and 86. Any excess air pressure in the building can be automatically exhausted through the barometric dampers 92, to prevent excessive internal pressure. Thus, in summary, the method incorporating mixed/re-circulating air is characterized by admitting return air from the space into the main stream of air to pass through the supply heat exchanger, while concurrently admitting fresh air into at least the bypass stream, and concurrently discharging return air from the space together with fresh air through an exhaust heat exchanger.

In the mixed fresh/re-circulating air mode with cooling, similar but opposite actions of the face and bypass dampers are achieved thus improving matching of the evaporator and condenser as previously described. In both heating and cooling in the mixed mode, the advantages of modulating the suction cut-off valve 37 in response to set point deviation are attained, producing the previously described tapering effect of heating or cooling as the set point deviation approaches zero.

As discussed previously with respect to the full re-circulating heating mode, in the mixed mode, air passing through the evaporator is warmer than outside air, and thus facilitates gathering of heat for the evaporator which increases system capacity considerably. Also, similarly to the full re-circulating mode previously described, heat pump defrosting is simplified due to the higher temperature of air passing through the evaporator coil.

With respect to the cooling mode when using mixed re-circulating and fresh air, as in the full re-circulating cooling mode previously described, the mixed air discharged through the exhaust heat exchanger, i.e. the condenser, is cooler than outside air which provides an improved heat sink for the condenser coil. The cooler the air passing through the condenser, the easier for rejection of heat and this also increases system capacity.

In summary, the mixed re-circulating and fresh air mode permits improved heat gathering or rejection due to the location of the exhaust coil 15 in the flow of air from the room, which provides a more favourable temperature for a heat sink or heat gathering than with a coil exposed to normal outside air for cooling or heating. While the energy recovery benefits in the mixed re-circulating and fresh air mode is less than in the full re-circulating mode, it is nevertheless a great improvement over conventional mixed air systems and many energy saving benefits can be attained.

ALTERNATIVES

The above describes an apparatus and method for treating air, that is either heating or cooling the air, within an air space within a building. The air can be either 100 per cent recirculated within the building, 100 per cent fresh air drawn in from the outside and discharged outside after passing through the space, or a mixture of fresh and recirculated air. Clearly, in specific applications where the various combinations above described are not required, the apparatus can be simplified considerably by having only the desired mode. However, in temperate zones, and where building regulations require a supply of fresh air of usually more than 10 per cent, the full range of options discussed above provide the best results.

While some of the advantages above are related to a close coupled system housed in a single housing 100, many of the advantages can also be attained if the supply and exhaust systems are separated. In such a separated arrangement, additional ducting would be required, but the two aspects of the invention would function essentially identically. In an alternative arrangement, which provides only one hundred percent fresh air heating and cooling, the supply flow section can be remotely located with respect to the exhaust flow section, and the dampers 85 and 86 are not required as there is no re-circulating mode. Consequently, the sides of the flow sections are replaced with solid panels and two flow sections are interconnected with refrigerant line sets. This eliminates extra duct work that would otherwise be required if the units were close coupled, and permits the supply and exhaust flow sections to be-located at the most convenient locations within the building. Also, for a system dedicated to fresh air mode only, with no re-circulating, the decoupling of the coupling means 57 would not be required, unless it was necessary for closing the dampers for complete isolation of the system from the outside, for example, during an emergency or fire shutdown.

The present apparatus as disclosed receives two main control signals which initiate and control the heating sequence and operation of components. The first control signal 56 is generated by the controller 53 (in response to the signal 65 from the sensor 51) and reflects difference between actual and pre-determined refrigerant condensing temperatures. This first control signal, via the modulating actuator 55, controls the face and bypass dampers to control temperature, and thus pressure of the refrigerant in the supply coil. The sensor 51 would normally be positioned in a location to detect actual refrigerant condensing temperature, i.e. at the exit of the condenser. This location is the preferred location of the sensor 51, but temperature at other locations in the supply coil could also be used. As air leaving the supply coil reflects, to some extent, refrigerant temperature in the supply coil, it could be possible, for some applications, to locate the sensor 51 directly in the air stream from the supply coil. Clearly, in this location, the thermostat should be relocated elsewhere.

While the sensor 51 is a temperature sensor, an alternative pressure sensor could be used to detect pressure on the high pressure side of the system. Preferably, the pressure sensor would be located in the compressor output line 40, and this can be used as a substitute to generate the first control signal to control the controller 53. This follows because the characteristic of the refrigerant can be assessed by either measuring temperature or pressure, as is well known in the art. In some applications, it might be possible to eliminate one temperature or pressure sensor, and instead provide a combined signal which could be suitably adjusted to actuate both the actuator 55 and the modulating valve 37.

The invention discloses variable face dampers 62 which control the main flow of air through the supply coil 16 in inverse proportion to flow through the bypass dampers, thus maintaining essentially constant total air flow into the air space. In some applications, the variable face dampers could be eliminated, and flow through the supply coil could be effectively controlled remotely by the bypass dampers 58. In this way, ratio of main to bypass flow would be dependent on the relative resistance between flow through the bypass dampers, and flow through the supply coil. It is considered that this alternative would be considerably less sensitive and more difficult to control than the preferred embodiment as disclosed as the total air flow rates would vary depending on the position of the bypass dampers and relative resistance to flow.

Also, the modulating valve 37 is provided to permit greater control of operation of the compressor by controlling refrigerant flow and pressure, and thus greater control of heat recovered and heat rejected. In some applications the valve 37 could be eliminated, permitting the compressor to function without this additional control. However, for normal temperate climates where occasionally only a small function of system heating capacity is required, use of the modulating suction cut-off valve 37 is preferred as there are less temperature fluctuations in the discharge air as the thermostat set-point is gradually attained.

The invention is disclosed showing an essentially constant volume f low through the supply chamber. This constant flow is attained by proportioning volume flow between the main duct and the bypass duct by controlling the respective main dampers and bypass dampers in an inversely proportional relationship. This is the preferred combination for most installations, and energy efficiency thereof is further improved by providing the modulating suction cut-off valve 37 which reduces heat rejection at the condenser. For some applications, where multiple or unloading compressors are not used, use of the modulating suction cut-off valve 37 as a means of capacity control for a heat pump can be employed with a considerable saving in cost, and in some instances, improvements in efficiency. In some alternate installations, where constant air volume flow is not of importance, the bypass flow duct and associated modulating bypass dampers 58 can be eliminated, and all air flow then passes through a single duct. In this alternative, capacity control using the cut-off valve 37 might be sufficient to provide an improvement over prior art methods for both heating and cooling.

In other installations, the telescopic coupling means 57 coupling the dampers 58 to the dampers 62 can be eliminated where one hundred percent re-circulating and fresh air options are required. In this instance, another actuator could be directly coupled to the bypass dampers 58, and an alternative means to permit simultaneous closing of both the face and bypass dampers would be required.

Also, in some installations where one hundred percent re-circulating is desired, the coupling 57 could be eliminated, and the re-circulating dampers 85 and 86 could also be eliminated. When one hundred percent re-circulating is not required, the actuator 55 could be directly coupled to the bypass dampers 58 by way of a solid rod, thus eliminating the option for uncoupling the bypass dampers.

The temperature sensors cooperating with conduits carrying refrigerant are expanding bulb types connected with capillary tubes to valves or other control means. While this is the preferred means of detecting temperature of the refrigerant, clearly equivalent temperature sensors could be substituted, for example sensors which directly generate electrical signals which are then used to actuate valves or related controls. Also, the thermostat of the control system as described is a preferred currently available unit which generates a plurality of signals for actuating or enabling other components of the system. Clearly, alternative control systems with similar functions can be substituted.

The exhaust air coil 15 is disclosed for location in the exhaust chamber 69, and thus receives a stream of treated inside air exhausted from the room. While this location of the exhaust coil is preferred because some room heat can be recovered from the exhaust air in the heating mode, and improved cooling generally results in the cooling mode, alternative locations of the exhaust coil are envisaged. Clearly, the exhaust coil can be located to be exposed to ambient or outside air as in a conventional air conditioning system, and this might be appropriate in certain installations. Also, heat could be gathered by the exhaust coil from waste water or a ground heating source.

To reduce load on the condenser and/or to obtain warm water for other purposes, an auxiliary coil could be placed in series with the discharge line 40 (FIG. 1). One purpose of this accessory would be to heat or pre-heat hot water tank makeup so that some relatively warm water could be generated when the system is running, independently of the mode of operation, that is, when it is operating in either heating or cooling. The amount of heat rejected by the refrigerant could be controlled by controlling the flow of cooling medium, that is water through the heat exchanger which, in some installations could cause refrigerant de-superheating in the auxiliary heat exchanger, and in some instances could also cause some condensation. This would reduce load on the condenser in high demand situations, which would reduce modulation of the face dampers in the cooling mode only. Clearly, when using the auxiliary heat exchange coil in the heating mode, less heat will be available for the room heating.

As an additional alternative, the temperature sensing bulb 44 which is shown in the discharge line 40 in FIG. 1, could be relocated on the suction line 42, and in this way, would control suction temperature which would indirectly prevent high compressor discharge temperatures.

I claim:

1. A method of treating air comprising the steps of:
   (a) generating main and bypass streams of air, and initially maintaining the two streams of air separate from each other,
   (b) directing the main stream of air through a supply heat exchanger of a vapour compression machine to change temperature of the main stream of air,
   (c) generating a first control signal representing a difference between an actual first reference temperature and a pre-determined first reference temperature,
   (d) controlling ratio of flow of the main and bypass streams of air in response to the first control signal so that if the first control signal reflects an actual first reference temperature below the pre-determined first reference temperature, the main flow is decreased if heating the main flow, or increased if cooling the main flow; and if the first signal reflects an actual first reference temperature above the pre-determined first reference temperature, the main flow is increased if heating the main flow, or decreased if cooling the main flow,
   (e) mixing the main stream of air after passing through the heat exchanger with the bypass stream of air, if any air were passed through the bypass flow control means, prior to delivering the mixture of air streams as required to a space.

2. A method as claimed in claim 1, further comprising:
   (a) controlling the main stream of air in response to the first control signal in an inverse flow ratio to the bypass stream of air, so that as flow through the main duct increases, flow through the bypass duct decreases and vice versa.

3. A method as claimed in claim 2, further characterized by:
   (a) feeding essentially all refrigerant through the supply heat exchanger and an exhaust heat exchanger so that the supply heat exchanger and the exhaust heat exchanger are both thermally active at all times during operation, and
   (b) when changing between heating and cooling modes, reversing refrigerant flow through the supply heat exchanger and the exhaust heat exchanger so that functions of the supply heat exchanger and the exhaust heat exchanger are reversed.

4. A method as claimed in claim 1, further comprising:
   (a) generating a second control signal reflecting difference between an actual second reference temperature and a pre-determined second reference temperature,
   (b) controlling heat exchange at the supply heat exchanger of the machine in proportion to difference between the actual second reference temperature and the pre-determined second reference temperature.

5. A method as claimed in claim 4, in which:
   (a) controlling the heat exchange at the supply heat exchanger by controlling heat gathered in an evaporator of the vapour compression machine from air passing through the evaporator.

6. A method as claimed in claim 1, further comprising:
   (a) generating a second control signal representing a difference between an actual second reference temperature and a pre-determined second reference temperature,
   (b) gradually varying flow of refrigerant to a compressor of the vapour compression machine in proportion to difference between the actual second reference temperature and the pre-determined second reference temperature, so that as the said difference becomes smaller, volumetric efficiency of the compressor is reduced and capacity of an evaporator of the machine is reduced, and vice versa.

7. A method as claimed in claim 2, wherein the first reference temperature reflects difference between actual temperature of circulating condensed refrigerant and a predetermined condensing temperature.

8. A method as claimed in claim 1, wherein the second reference temperature reflects difference between actual temperature of air delivered and mixed in the main space and a predetermined space temperature.

9. A method as claimed in claim 1, further characterized by:
   (a) exchanging heat between air being exhausted from the space and refrigerant.

10. A method as claimed in claim 1, further characterized by:
    (a) admitting return air from the space into the main stream of air to pass through the supply heat exchanger, while concurrently admitting fresh air into at least the bypass stream,
    b) discharging return air from the space together with fresh air through an exhaust heat exchanger.

11. A method as claimed in claim 1, in which the method can be practiced in a fresh air mode, or in a re-circulating mode, the method being further characterized by:
    (a) when operating in the fresh air mode, initially drawing fresh air through main and bypass flow control means to generate the main and the bypass streams of air respectively, and simultaneously exhausting to atmosphere return air delivered from the space, and
    (b) when changing to the re-circulating mode, selectively cancelling the said inverse flow ratio between the main and bypass streams of air and closing the main and bypass flow control means, so as to prevent entry of fresh air and flow of the bypass stream of air, and re-directing the return air from the space through the supply heat exchanger to generate the main stream of air.

12. A method as claimed in claim 11, further characterized by:
    (a) when operating in the fresh air mode, preventing mixing of air delivered to the space with return air exhausted from the space by maintaining first and second re-circulating flow control means closed, and exhausting the heated air from the space through an opened exhaust flow control means, and
    (b) when changing to the re-circulating mode, opening the first and second re-circulating flow control means and closing the exhaust flow control means so that fresh air passes through the opened first re-circulating flow control means to an exhaust heat exchanger, return air exhausted from the space passes through the opened second re-circulating flow control means to the supply heat exchanger, and the closed exhaust flow control means prevents mixing between the return air from the space and the fresh air.

13. An apparatus for treating air for delivery to a space, the apparatus comprising:
    (a) a supply chamber having main and bypass ducts for receiving and initially maintaining separate main and bypass streams of air respectively,
    (b) propulsion means for generating air flow through at least one of the ducts,
    (c) a supply heat exchanger of a vapour compression machine provided in the main duct to change temperature of the main stream of air passing along the main duct by condensing refrigerant at a condensing temperature in a heating mode, and by evaporating refrigerant in a cooling mode,
    (d) an exhaust heat exchanger of the vapour compression machine located to receive heat to evaporate refrigerant when in the heating mode, and to reject heat due to condensation of refrigerant when in the cooling mode,
    (e) first temperature sensor means for generating a first control signal representing a first temperature difference between an actual first reference temperature and a pre-determined first reference temperature, the first temperature sensor means cooperating with the heat exchanger functioning as a condenser so as to be responsive to said condensing temperature,
    (f) air flow control means for controlling ratio of flow of streams of air through the main and bypass ducts,
    (g) actuator means for actuating the air flow control means so as to vary ratio of restriction to air flow through the main and bypass ducts, the actuator means being operatively coupled to the air flow control means and being responsive to the first control signal so as to control heat rejection at the condenser to facilitate thermal balancing of the heat received by the evaporator and the heat rejected by the condenser, and
    (h) mixing means for mixing outlet flows discharged from the main and bypass ducts prior to discharging the mixed streams of air into the space.

14. An apparatus as claimed in claim 13, in which:
    (a) the air flow control means comprises main flow control means and bypass flow control means cooperating with the main duct and bypass duct respectively to control flow therethrough,
    (b) the main flow control means cooperates with the first temperature sensor means to be responsive to the first control signal, so that as the first temperature difference increases, the main flow control means is actuated to decrease flow through the supply heat exchanger and vice versa, so as to maintain thermal balance, and the apparatus further comprises:
    (c) coupling means coupled to the main flow control means and the bypass flow control means so that the bypass flow control means is actuated in an inverse relationship to the main flow control means.

15. An apparatus as claimed in claim 14, in which:
    (a) the main flow control means is located in the main duct and spaced upstream from the supply heat exchanger to define an inlet space therebetween with the main duct,
   and the apparatus further includes:
    (b) recirculating flow control means disposed between the inlet space and the space receiving the treated air, the recirculating flow control means being settable at or between open or closed positions.

16. A apparatus as claimed in claim 15, in which:
    (a) an exhaust chamber communicates with the space receiving the treated air to receive air being exhausted therefrom, (b) the re-circulating flow control means forms a first openable partition between the supply and exhaust chambers to permit communication therebetween when the re-circulating flow control means are open.

17. An apparatus as claimed in claim 16, in which:
(a) the exhaust chamber has a second openable partition to divide the exhaust chamber into a return portion and an exhaust portion communicating with the main space and atmosphere respectively,
(b) the main flow control means can be closed together with the second openable partition when the re-circulating flow control means are open in the re-circulating mode to direct return air from the space back into the space.

18. An apparatus as claimed in claim 15, in which the apparatus can be operated in a fresh air mode or in a re-circulating mode, the apparatus being further characterized by:
(a) de-coupling means selectively co-operating with the coupling means to de-couple the main flow control means from the bypass flow control means to cancel the inverse relationship between the main and bypass flow control means when changing from the fresh air mode to the re-circulating mode, and
(b) control means interconnecting the coupling means with the recirculating flow control means so that when the de-coupling means is activated to cancel the inverse relationship when changing from the fresh air mode to the re-circulating flow mode, the re-circulating flow control means is opened to pass return air exhausted from the space to the supply heat exchanger, and the main flow control means is closed to prevent entry of fresh air into the apparatus.

19. An apparatus as claimed in claim 18, in which the re-circulating flow control means is further characterized by:
(a) a first re-circulating flow control means which is closed in the fresh air mode for preventing fresh air from mixing with the return air exhausted from the space, and which is opened in the re-circulating mode to permit flow of fresh air through the exhaust heat exchanger, and
(b) a second re-circulating flow control means which is closed in the fresh air mode for preventing return air exhausted from the space from mixing with fresh air drawn through the supply heat exchanger, and which is opened in the re-circulating mode to permit flow of return air from the space into the supply heat exchanger.

20. An apparatus as claimed in claim 19, further characterized by:
(a) an exhaust flow control means which is open in the fresh air mode for directing air returning from the space through the exhaust heat exchanger to atmosphere, and when closed in the re-circulating mode, for preventing air returning from the space from exhausting to atmosphere.

21. An apparatus as claimed in claim 14, further including:
(a) de-coupling means cooperating with the coupling means to de-couple the main flow control means from the bypass means as required, so as to cancel the inverse relationship between the flow control means.

22. An apparatus as claimed in claim 21, in which:
(a) the coupling means includes first and second rods operatively connecting together the bypass flow control means and the main flow control means to provide said inverse relationship,
(b) the de-coupling means is operative to separate the rods when required.

23. An apparatus as claimed in claim 22, in which the coupling means comprises:
(a) guide means for guiding extension and retraction movement between the first and second rods,
(b) magnetic means for coupling together inner ends of the rods,
(c) retaining means for retaining one rod in a position while magnetic force coupling the rods together is overcome, permitting the rods to separate and de-couple the flow control means.

24. An apparatus as claimed in claim 21, in which:
(a) the bypass flow control means is releasably coupled to the main flow control means to permit de-coupling therefrom,
(b) the bypass flow control means are normally biased to a closed position so that when de-coupled from the main flow control means, the bypass flow control means automatically close.

25. An apparatus as claimed in claim 14, in which the apparatus can be operated in a fresh air mode or in a re-circulating mode, the apparatus being further characterized by:
(a) de-coupling means selectively cooperating with the coupling means to de-couple the main flow control means from the bypass flow control means to cancel the inverse relationship between the main and bypass flow control means when changing from the fresh air mode to the re-circulating mode.

26. An apparatus as claimed in claim 14, further characterized by:
(a) conduits and a compressor interconnecting the supply heat exchanger with the exhaust heat exchanger so that essentially all the refrigerant is fed in series through the supply heat exchanger and the exhaust heat exchanger so that the supply heat exchanger and the exhaust heat exchanger are both thermally active when the apparatus is operating, and
(b) a refrigerant fluid reversing valve having first and second positions and cooperating with a suction conduit and a discharge conduit communicating with the compressor, and in the first position thereof the valve also communicates with a vapour conduit communicating with the a heat exchanger functioning as a condenser, and with a vapour conduit communicating with a heat exchanger functioning as an evaporator; position of the valve being reversible so that direction of refrigerant flow through the said vapour conduits is reversible, and functions of the condenser and the evaporator are interchangeable so that the heat exchanger functioning as the condenser becomes the evaporator, and the heat exchanger functioning as the evaporator becomes the condenser, so that air discharged from the apparatus can be either cooled or heated.

27. An apparatus as claimed in claim 13, further comprising:
(a) second temperature sensor means for generating a second control signal representing a second temperature difference between an actual second reference temperature and a pre-determined second reference temperature, (b) heat exchange control means for controlling heat exchanged at the supply heat exchanger, the heat exchanger control means cooperating with a compressor of the vapour compression machine so that heat exchange is in proportion to difference between the actual second reference temperature and the pre-determined second reference temperature, so that as the said difference becomes gradually smaller, heat transferred between air passing through the supply heat exchanger is gradually reduced, and vice versa.

28. An apparatus as claimed in claim 27, in which:
(a) the heat exchange control means is a fluid flow modulating valve cooperating with a conduit communicating with an intake of the compressor of the vapour compression machine, the fluid flow modulating valve being responsive to the second temperature sensor so that as the actual second reference temperature gradually approaches the pre-determined second reference temperature, flow of refrigerant through the compressor is gradually reduced so that heat exchanged at the supply heat exchanger is correspondingly gradually reduced.

29. An apparatus as claimed in claim 13, in which:
(a) an exhaust heat exchanger is located in an exhaust portion communicating with the space receiving the treated air.

30. An apparatus for treating air for delivery to a space, the apparatus comprising:
(a) a supply chamber having main and bypass ducts for receiving and initially maintaining separate main and bypass streams of air respectively,
(b) propulsion means for generating air flow through at least one of the ducts,
(c) a supply heat exchanger of a vapour compression machine provided in the main duct to change temperature of the main stream of air passing along the main duct,
(d) first temperature sensor means for generating a first control signal representing difference between an actual first reference temperature and a pre-determined first reference temperature,
(e) air flow control means for controlling ratio of flow of streams of air through the main and bypass ducts,
(f) actuator means for actuating the air flow control means so as to vary ratio of restriction to air flow through the main and bypass ducts, the actuator means being operatively coupled to the air flow control means and being responsive to the first control signal,
(g) mixing means for mixing outlet flows discharged from the main and bypass ducts prior to discharging the mixed streams of air into the space,
(h) second temperature sensor means for generating a second control signal representing a second temperature difference between an actual second reference temperature and a pre-determined second reference temperature, and
(i) heat exchange control means for controlling heat exchanged at the supply heat exchanger, the heat exchanger control means cooperating with a compressor of the vapour compression machine so that heat exchange is in proportion to the second temperature difference between the actual second reference temperature and the pre-determined second reference temperature, so that as the said second temperature difference becomes gradually smaller, heat transferred between air passing through the supply heat exchanger is gradually reduced, and vice versa.

31. An apparatus as claimed in claim 30, in which:
(a) the heat exchange control means is a fluid flow modulating valve cooperating with a conduit communicating with an intake of the compressor of the vapour compression machine, the fluid flow modulating valve being responsive to the second temperature sensor so that as the actual second reference temperature gradually approaches the pre-determined second reference temperature, flow of refrigerant through the compressor is gradually reduced so that heat exchanged at the supply heat exchanger is correspondingly gradually reduced.

32. An apparatus for treating air for delivery to a space, the apparatus comprising:
(a) a supply chamber having main and bypass ducts for receiving and initially maintaining separate main and bypass streams of air respectively,
(b) propulsion means for generating air flow through at least one of the ducts,
(c) a supply heat exchanger of a vapour compression machine provided in the main duct to change temperature of the main stream of air passing along the main duct,
(d) first temperature sensor means for generating a first control signal representing difference between an actual first reference temperature and a pre-determined first reference temperature,
(e) air flow control means for controlling ratio of flow of streams of air through the main and bypass ducts, the air flow control means comprising main flow control means and bypass flow control means cooperating with the main duct and bypass duct respectively to control flow therethrough, the main flow control means being located in the main duct and spaced upstream from the supply heat exchanger to define an inlet space therebetween with the main duct,
(f) actuator means for actuating the air flow control means so as to vary ratio of restriction to air flow through the main and bypass ducts, the actuator means being operatively coupled to the air flow control means and being responsive to the first control signal,
(g) mixing means for mixing outlet flows discharged from the main and bypass ducts prior to discharging the mixed streams of air into the space,
(h) coupling means coupled to the main flow control means and the bypass flow control means so that the bypass flow control means is actuated in an inverse relationship to the main flow control means,
(i) an exhaust chamber communicating with the space receiving the treated air to receive air being exhausted therefrom, and
(j) re-circulating flow control means disposed between the inlet space and the space receiving the treated air, the re-circulation flow control means being settable at or between open or closed positions, and forming a first openable partition between the supply and exhaust chambers to permit communication therebetween when the re-circulating flow control means are open.

33. An apparatus as claimed in claim 32, in which:

(a) the exhaust chamber has a second openable partition to divide the exhaust chamber into a return portion and an exhaust portion communicating with the main space and atmosphere respectively, and (b) the main flow control means can be closed together with the second openable partition when the re-circulating flow control means are open in the re-circulating mode to direct return air from the space back into the space.

34. An apparatus for treating air for delivery to a space, the apparatus comprising:

(a) a supply chamber having main and bypass ducts for receiving and initially maintaining separate main and bypass streams of air respectively, (b) propulsion means for generating air flow through at least one of the ducts, (c) a supply heat exchanger of a vapour compression machine provided in the main duct to change temperature of the main stream of air passing along the main duct, (d) first temperature sensor means for generating a first control signal representing difference between an actual first reference temperature and a pre-determined first reference temperature, (e) air flow control means for controlling ratio of flow of streams of air through the main and bypass ducts, the air flow control means comprising main flow control means and bypass flow control means cooperating with the main duct and bypass duct respectively to control flow therethrough, (f) actuator means for actuating the air flow control means so as to vary ratio of restriction to air flow through the main and bypass ducts, the actuator means being operatively coupled to the air flow control means and being responsive to the first control signal, (g) mixing means for mixing outlet flows discharged from the main and bypass ducts prior to discharging the mixed streams of air into the space, (h) coupling means coupled to the main flow control means and the bypass flow control means so that the bypass flow control means is actuated in an inverse relationship to the main flow control means, and (i) de-coupling means cooperating with the coupling means to de-couple the main flow control means from the bypass means as required, so as to cancel the inverse relationship between the flow control means.

35. An apparatus as claimed in claim 34, in which:

(a) the coupling means includes first and second rods operatively connecting together the bypass flow control means and the main flow control means to provide said inverse relationship, and (b) the de-coupling means is operative to separate the rods when required.

36. An apparatus as claimed in claim 34, in which:

(a) the bypass flow control means is releasably coupled to the main flow control means to permit de-coupling therefrom, and (b) the bypass flow control means are normally biased to a closed position so that when de-coupled from the main flow control means, the bypass flow control means automatically close.

* * * * *